US009053886B2

(12) United States Patent
Kamor et al.

(10) Patent No.: US 9,053,886 B2
(45) Date of Patent: Jun. 9, 2015

(54) FAULT CIRCUIT INTERRUPTER DEVICE

(71) Applicant: Leviton Manufacturing Co., Inc., Melville, NY (US)

(72) Inventors: Michael Kamor, North Massapequa, NY (US); James Porter, Farmingdale, NY (US); Kurt Dykema, Holland, MI (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 14/031,756

(22) Filed: Sep. 19, 2013

(65) Prior Publication Data

US 2014/0055904 A1 Feb. 27, 2014

Related U.S. Application Data

(60) Division of application No. 12/986,016, filed on Jan. 6, 2011, now Pat. No. 8,587,914, which is a continuation of application No. PCT/US2009/049840, filed on Jul. 7, 2009.

(60) Provisional application No. 61/078,753, filed on Jul. 7, 2008, provisional application No. 61/080,205, filed on Jul. 11, 2008.

(51) Int. Cl.

| | |
|---|---|
| ***H01H 73/00*** | (2006.01) |
| ***H01H 3/00*** | (2006.01) |
| ***H02H 3/00*** | (2006.01) |
| ***H01H 71/12*** | (2006.01) |
| ***H01H 73/12*** | (2006.01) |
| *H01H 83/14* | (2006.01) |

(52) U.S. Cl.
CPC ............. *H01H 73/00* (2013.01); *H01H 71/125* (2013.01); *H01H 83/144* (2013.01); *H01H 73/12* (2013.01)

(58) Field of Classification Search
CPC ..... H01H 71/125; H01H 73/00; H01H 73/04; H01H 73/045; H01H 73/12; H01H 83/114; H01H 1/2041
USPC ........................................ 361/115, 42; 335/77
See application file for complete search history.

(56) References Cited

U.S. PATENT DOCUMENTS

| | | | | |
|---|---|---|---|---|
| 4,567,456 | A * | 1/1986 | Legatti | 335/20 |
| 6,442,006 | B1 * | 8/2002 | Baertsch et al. | 361/42 |
| 2007/0279162 | A1 * | 12/2007 | Zhang et al. | 335/21 |

* cited by examiner

*Primary Examiner* — Scott Bauer
(74) *Attorney, Agent, or Firm* — Leviton Manufacturing Co., Inc.

(57) ABSTRACT

In one embodiment, there is a fault interrupter device comprising at least one sensor comprising at least one first transformer having at least one outer region forming an outer periphery and at least one inner hollow region. There is also at least one second transformer that is disposed in the inner hollow region of the at least one first transformer. The transformers can be substantially circular in configuration, and more particularly, ring shaped. In another embodiment there is a rotatable latch which is used to selectively connect and disconnect a set of separable contacts to selectively disconnect power from the line side to the load side. The rotatable latch is in one embodiment coupled to a reset button. In at least one embodiment there is a slider which is configured to selectively prevent the manual tripping of the device.

18 Claims, 33 Drawing Sheets

FIG. 7A
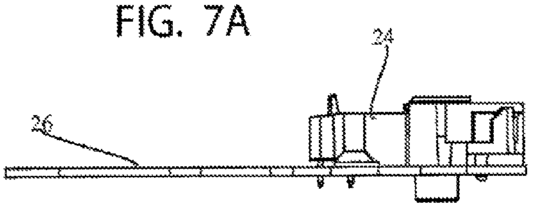
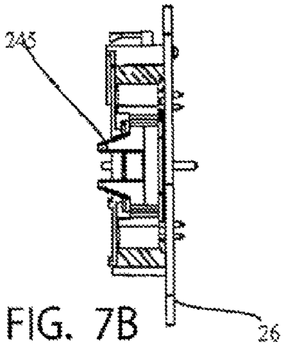
FIG. 7B
FIG. 7C
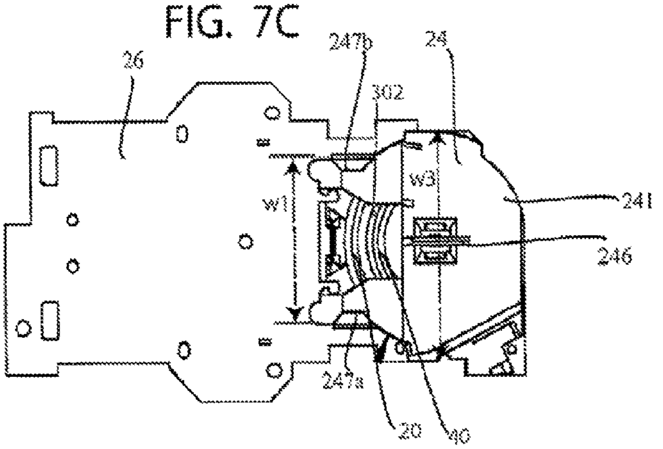
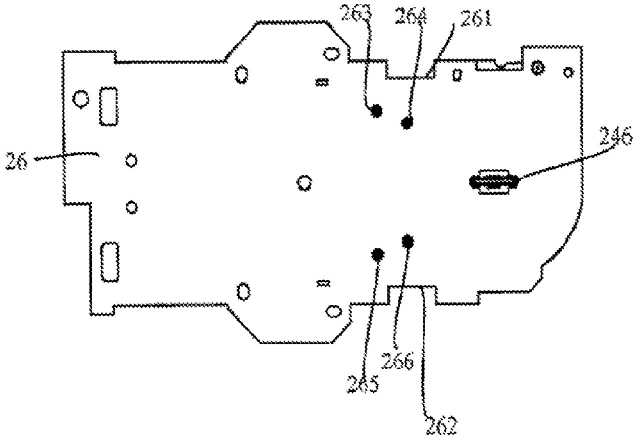
FIG. 7D

FIG. 7G
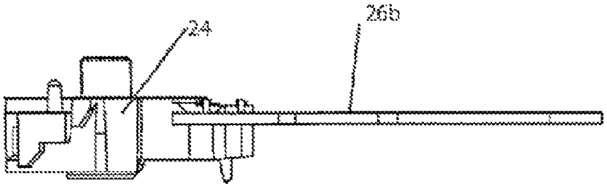
FIG. 7H
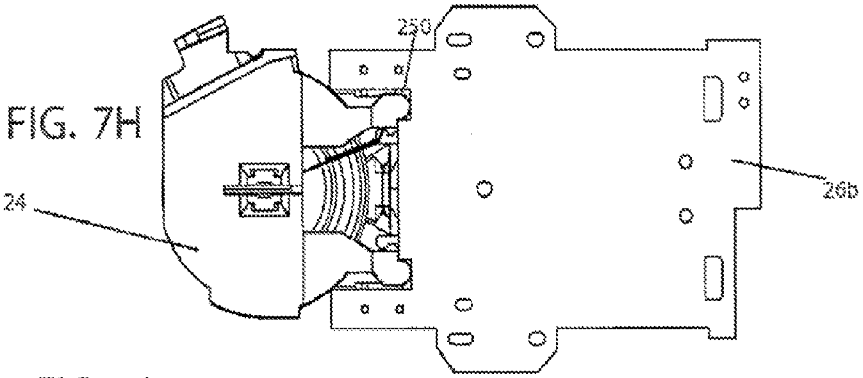
FIG. 7I
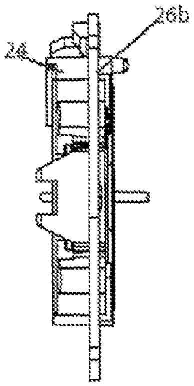
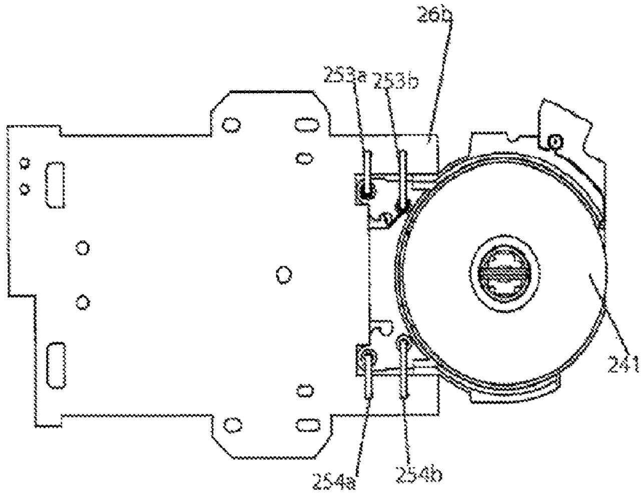
FIG. 7J

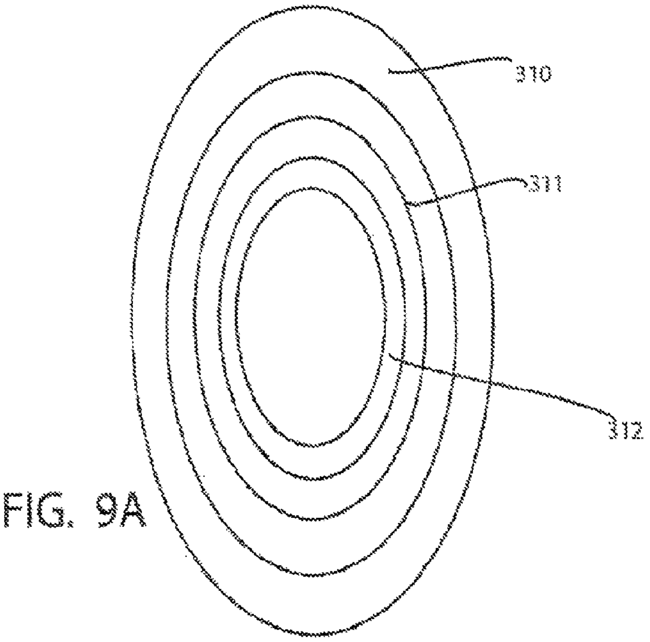
FIG. 9A
FIG. 9B
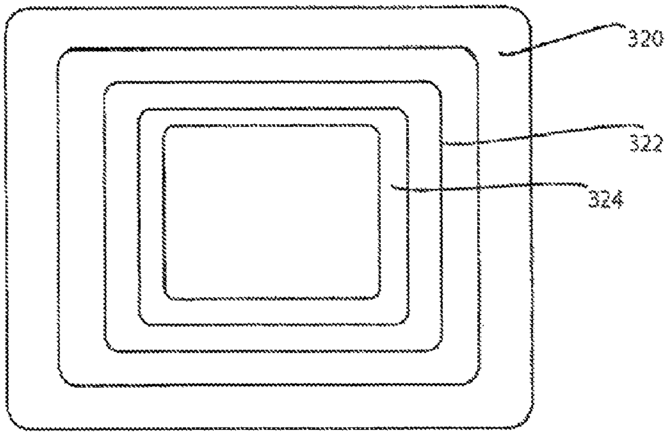

SECTION A–A

SECTION B–B

FIG. 14A
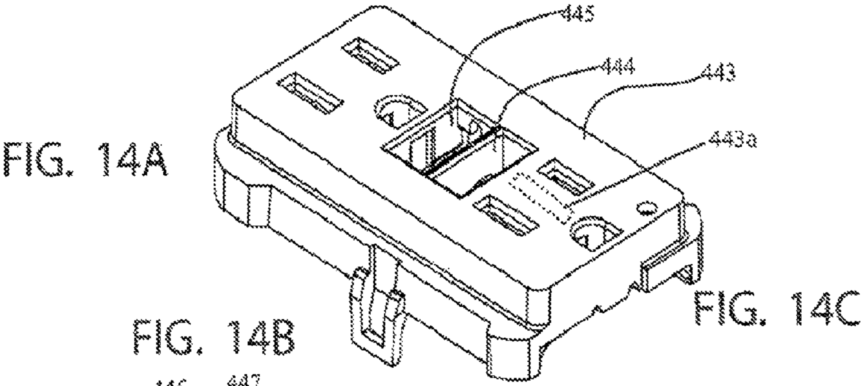
FIG. 14C
FIG. 14B
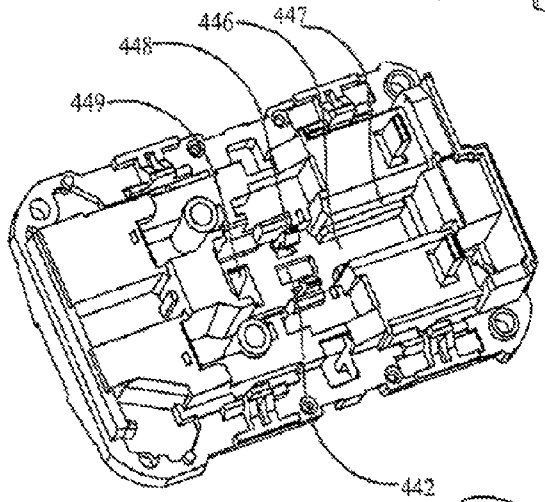
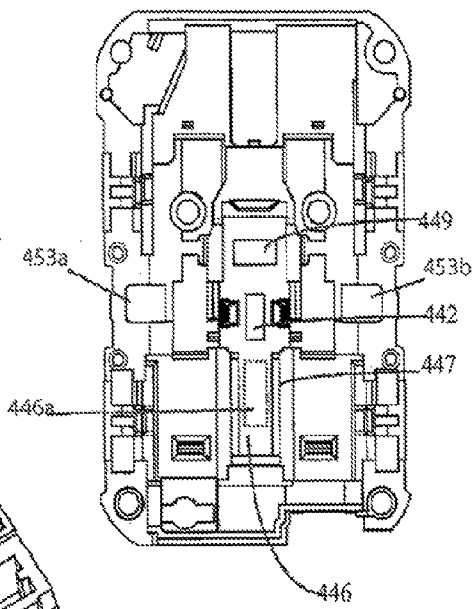
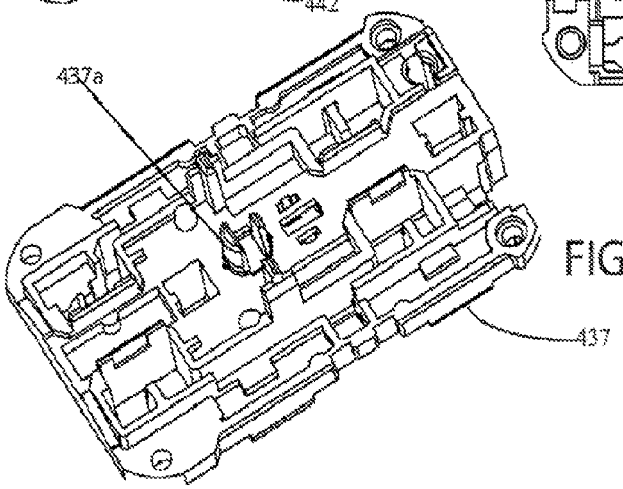
FIG. 14D

FIG. 15A
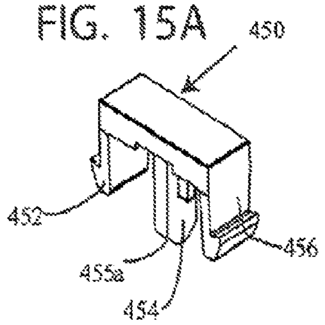
FIG. 15B
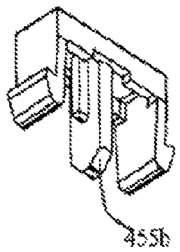
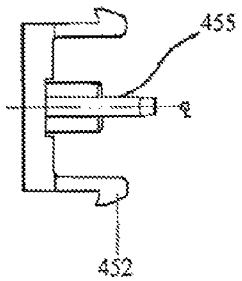
FIG. 15C
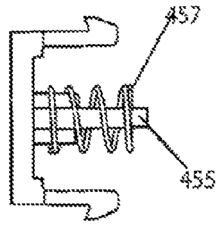
FIG. 15D

FIG. 18A
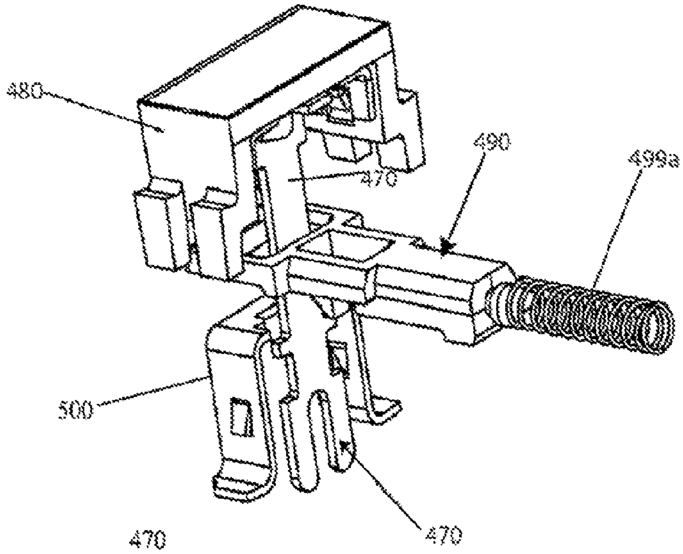
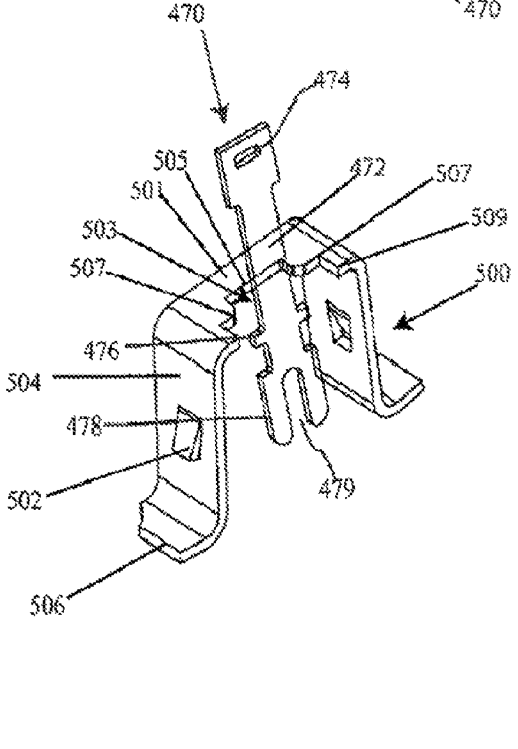
FIG. 18B

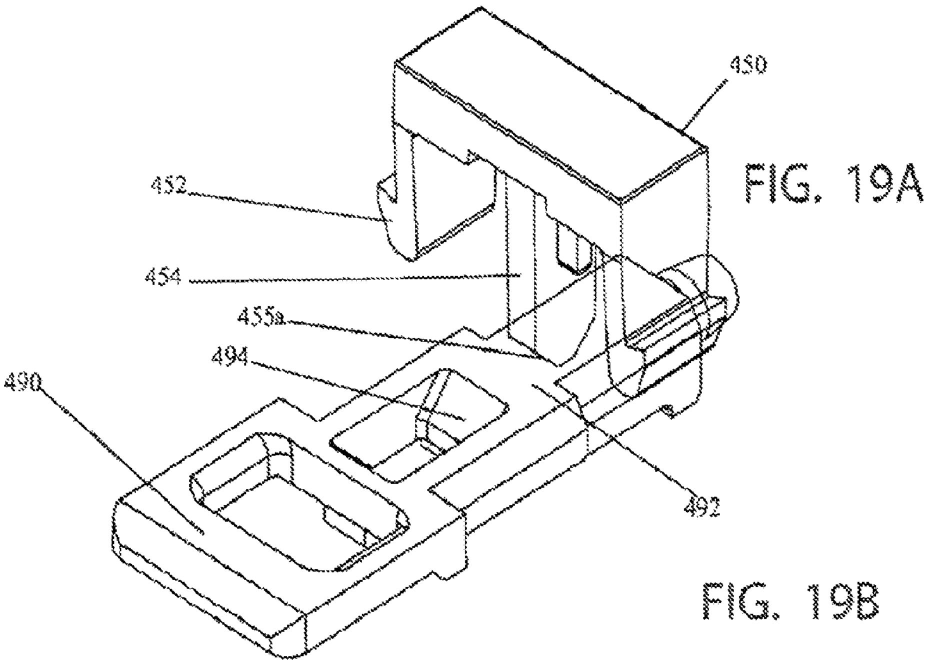
FIG. 19A
FIG. 19B
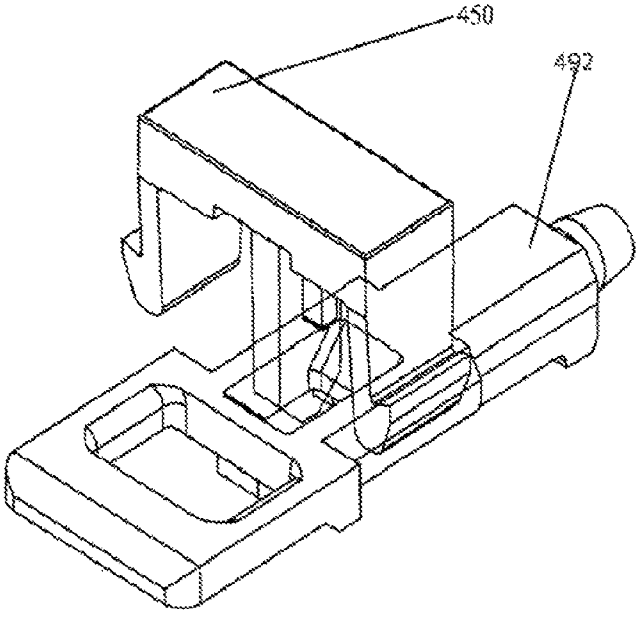

FIG. 23A
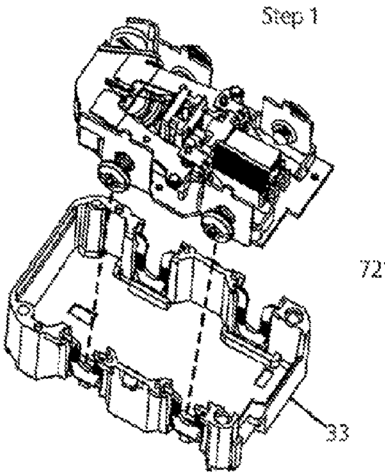
FIG. 23D
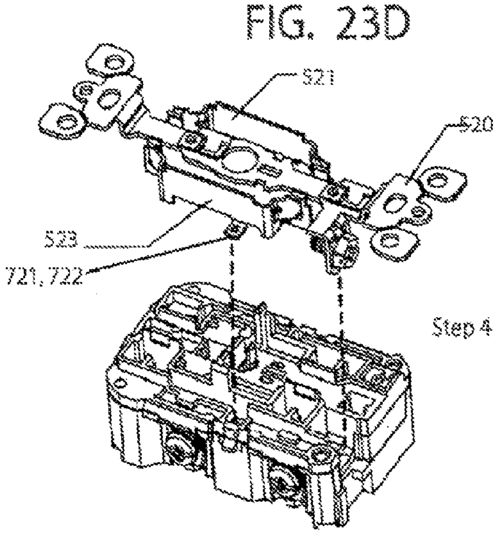
FIG. 23B
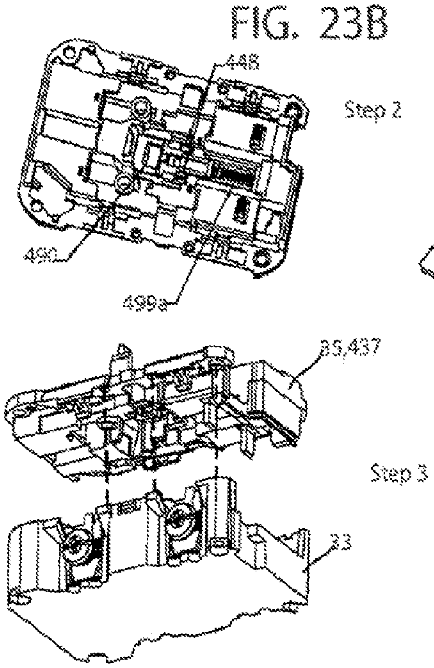
FIG. 23C
FIG. 23E
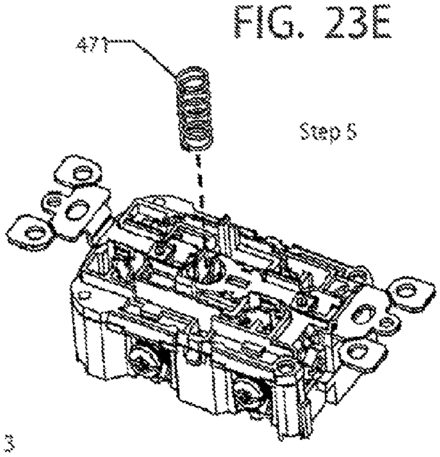

FAULT CIRCUIT INTERRUPTER DEVICE

CROSS REFERENCE TO RELATED APPLICATIONS

This application is a divisional application of U.S. patent application Ser. No. 12/986,016, filed on Jan. 6, 2011, which is a continuation application of International Application Serial No. PCT/US2009/049840, filed on Jul. 7, 2008, wherein the international application is a non-provisional application and hereby claims priority from U.S. Provisional Patent Application Ser. No. 61/078,753 to Dykema et al filed on Jul. 7, 2008, and provisional application Ser. No. 61/080,205 to Michael Kamor filed on Jul. 11, 2008 wherein the disclosure of all of these applications are hereby incorporated herein by reference in their entirety.

BACKGROUND

Electrical devices such as fault circuit interrupters are typically installed into a wall box. Wall boxes which can also be called electrical boxes are typically installed within a wall and are attached to a portion of the wall structure, such as vertically or horizontally extending framing members.

Typically, the depth of the wall box is constrained by the depth of the wall and/or the depth of the wall's framing members. Electrical wiring is typically fed into a region of the wall box for electrical connections to/from the electrical device(s) resulting in a portion of the wall box's volume/depth being utilized by this wiring, while the remaining volume/depth of the wall box is utilized by an installed electrical device. Since normal installation of electrical devices is typically constrained by the distance in which they may extend beyond the finished wall surface, the greater the depth of the housing of the electrical device, the harder it is to fit an electrical device within the constraints posed by the electrical wall box and the finished wall surface. Wall boxes are typically configured to receive two electrical connections, one for line and the other for load, each containing a hot/phase wire, a neutral wire and a ground wire, for a total of five or even six wires being fed/connected into the wall box.

In many cases, circuit interrupters are incorporated into single gang electrical devices such as duplex receptacles, a switch or combination switch receptacles.

Single gang electrical enclosures, such as a single gang wall boxes, are generally enclosures that are configured to house electrical devices of particular heights, widths and depths. In many cases, single gang metallic boxes can vary in height from 2⅞" to 3⅞" and in width from 1 13/16" to 2", while single gang non-metallic boxes can vary in height from 2 15/16" to 3 9/16" and in width from 2" to 2 1/16". Therefore, for purposes of this disclosure, a standard single gang box would have a width of up to 2½ inches. A non standard single gang box would have a width of even larger dimensions up to the minimum classification for a double gang box, and any appropriate height such as up to approximately 3⅞". It is noted that the width of a double gang box is 3 13/16 inches according to NEMA standards. See NEMA Standards Publication OS 1-2003 pp. 68, Jul. 23, 2003.

Due to the space restraints, and because of the complexity of electrical designs of fault circuit interrupter designs in general (i.e., circuit interrupters typically include a number of electrical components), circuit interrupter designs based upon the present state of the art do not allow for much reduction in the depth of the device.

SUMMARY

One embodiment relates to a fault interrupter device having at least two nested transformers or sensors wherein the second transformer is disposed at least partially in an inner hollow region of a first transformer.

In this case, in at least one embodiment there is a device comprising at least one first transformer having at least one outer region forming an outer periphery and at least one inner hollow region. There is also at least one second transformer that is disposed in the inner hollow region of the at least one first transformer. In at least one embodiment, the transformers can include at least one of a differential transformer and a grounded/neutral transformer.

In addition, another embodiment can also relate to a process for reducing a depth of a fault circuit interrupter device. The process includes the steps of positioning at least one transformer inside of another transformer; such that these transformers are positioned on substantially the same plane. Alternatively, each of the transformers or sensors can be positioned on planes that are offset from one another wherein the transformers or sensors are not necessarily entirely nested, one within the other.

Thus, one of the benefits of this design is a fault circuit interrupter having a reduced depth while still leaving additional room for wiring the device in a wall box, and for additional wiring components such as wire connectors.

In addition, in at least one embodiment there is a fault interrupter device for selectively disconnecting power between a line side and a load side. In this case, the interrupter device comprises a housing, and a fault detection circuit disposed in the housing and for determining the presence of a fault. In addition coupled to the fault detection circuit and disposed in the housing is an interrupting mechanism. The interrupting mechanism is configured to disconnect power between the line side and the load side when the fault detection circuit determines the presence of a fault. With this embodiment, the interrupting mechanism comprises a set of interruptible contacts. The interrupting mechanism can include a rotatable latch.

There is also a reset mechanism disposed in the housing comprising at least one rotatable latch. The reset mechanism is for selectively connecting the set of separable contacts together to connect the line side with the load side.

In addition, in one embodiment there is a lock for selectively locking the manual tripping of interruptible contacts.

In another embodiment, there is a non-electric indicator disposed in the housing, the non-electric indicator being configured to indicate at least two different positions of the contacts. Alternatively, there can be an electric indicator provided as well.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 7A is a side view of the housing of FIG. 5A coupled to a circuit board; FIG. 7B is an end view of the housing of FIG. 5A coupled to the circuit board;

FIG. 7C is a top view of the housing of FIG. 5A coupled to the circuit board;

FIG. 7D is a bottom view of the housing of FIG. 5A coupled to the circuit board.

FIG. 7G is a side view of another embodiment including a different circuit board;

FIG. 7H is a top view of the embodiment shown in FIG. 7G;

FIG. 7I is a side view of the embodiment shown in FIG. 7G;

FIG. 7J is a bottom view of the embodiment shown in FIG. 7G and opposite the side view of FIG. 7H;

FIG. 9A is a top view of the two transformers in an oval shape;

FIG. 9B is a top view of the two transformers in a substantially square shape;

FIG. 14A is a top perspective view of a front face; FIG. 14B is a top perspective view of a bottom face of the middle housing;

FIG. 14C is a bottom view of the middle housing;

FIG. 14D is a top perspective view of the middle housing;

FIG. 15A is a top perspective view of a test button;

FIG. 15B is a bottom perspective view of a test button; FIG. 15C is a side view of a test button;

FIG. 15D is a side perspective view of the test button having a spring;

FIG. 18A is a perspective view of a latch, a trip slider and a latch plate positioned adjacent to each other;

FIG. 18B is a side perspective view of a latch plate and a latch;

FIG. 19A is a top perspective view of a test button and a trip slider positioned adjacent to each other wherein the trip slider is in a non-reset position;

FIG. 19B is a top perspective view of a test button and a trip slider positioned adjacent to each other wherein the trip slider is in a reset position;

FIG. 23A is a perspective view of the assembly being inserted into a back housing;

FIG. 23B is a perspective view of the middle housing being coupled to the slider;

FIG. 23C is a perspective view of the middle housing being coupled to the back housing;

FIG. 23D is a perspective view of the strap being coupled to the assembly of components shown in FIG. 23C;

FIG. 23E is a perspective view of the reset spring being inserted into the assembly shown in FIG. 23D;

DETAILED DESCRIPTION

In the past, fault circuit interrupters have been designed with transformers or sensors having similar dimensions wherein these transformers are stacked one adjacent to the other such as one on top of the other. The stacking of these transformers requires sufficient depth in the housing of the electrical device to accommodate these stacked transformers or sensors.

Figure 1A:
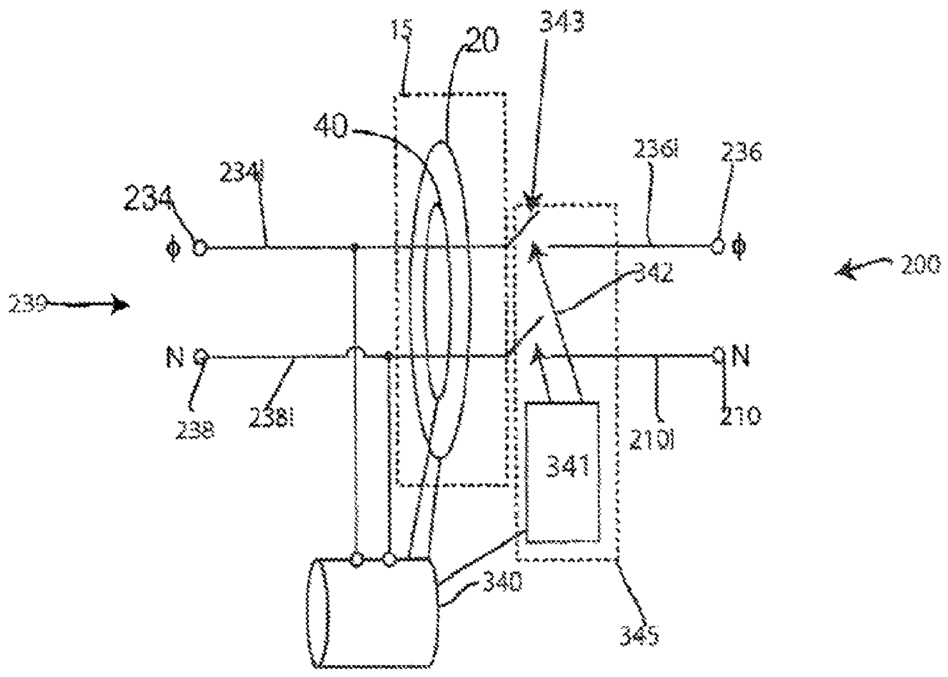
FIG. 1A is a simplified schematic block diagram of a circuit incorporating nested transformers.
Figure 1B:
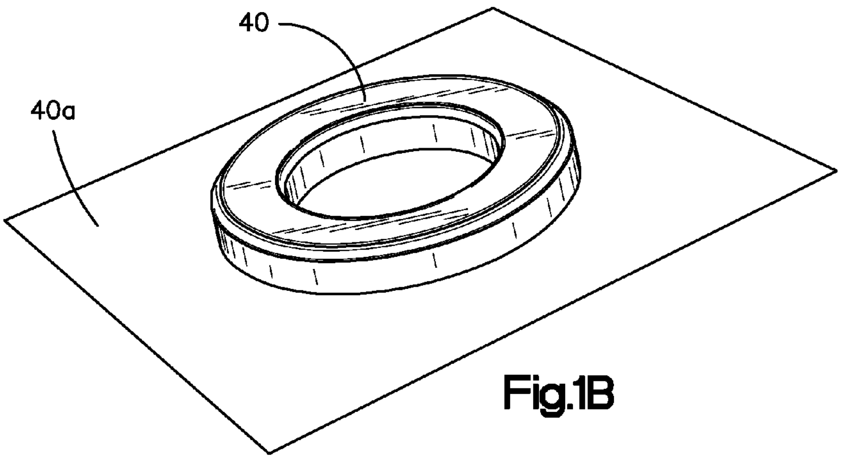
FIG. 1B is a first view three dimensional view of a circumferential plane bisecting a transformer.
Figure 1C:
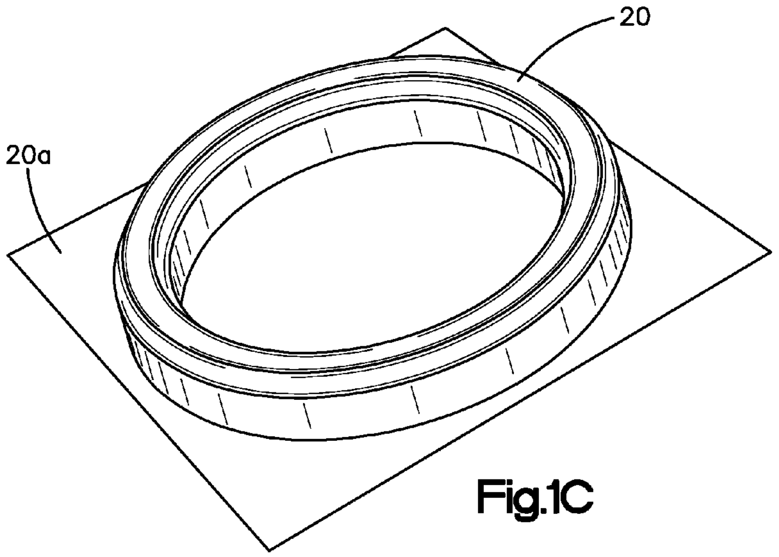
FIG. 1C is a second three-dimensional view of a circumferential plane bisecting a second transformer wherein that plane is offset from the plane shown in FIG. 1B.
Figure 1D:
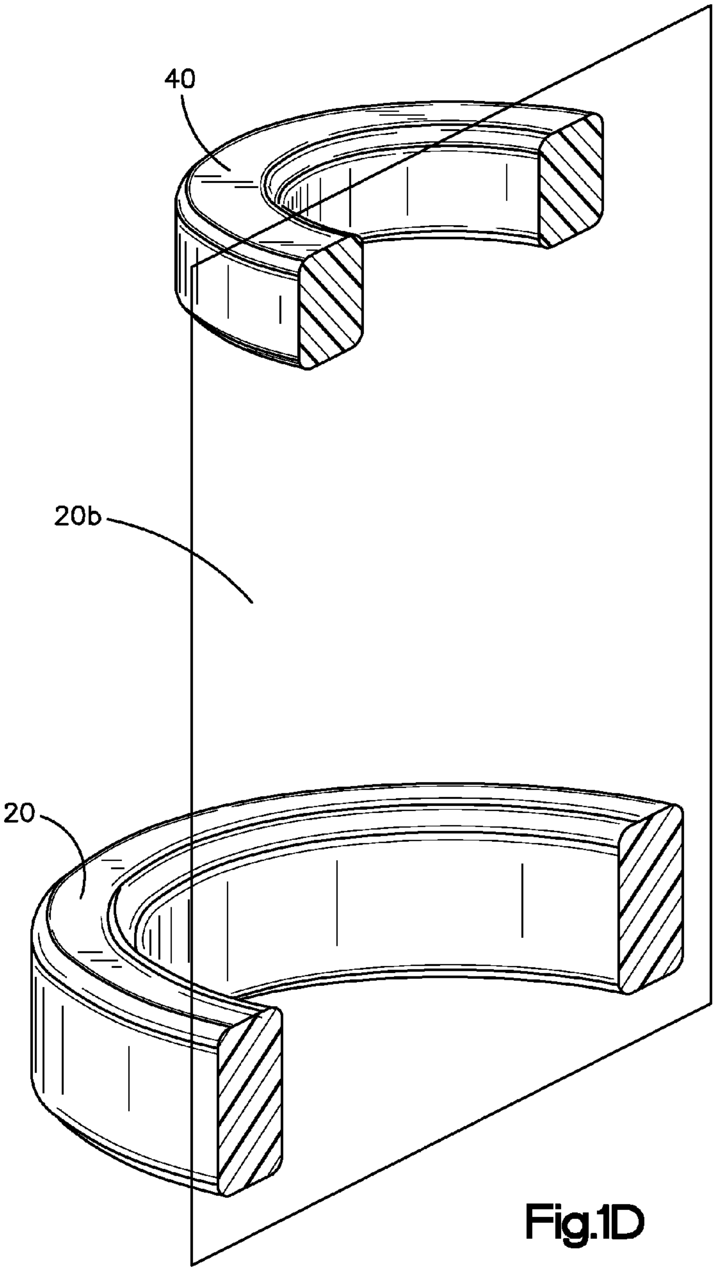
FIG. 1D is a third view of a plane bisecting both transformers.

Therefore, to reduce this depth, FIG. 1A shows a schematic block diagram of a fault circuit interrupter having nested transformers or sensors such as transformers 20 and 40 in a nested configuration. In a nesting configuration, at least one transformer or sensor is disposed at least partially within the other transformer's interior volume. In one embodiment, the transformers' circumferential planes 20*a*, 40*a* (See FIGS. 1B and 1C) and radial planes 20*b* (See FIG. 1D) are substantially aligned, or substantially coincide with one another. In other embodiments the transformers may still be at least partially nested (e.g., one transformer being at least partially disposed within the other transformer's interior volume) but positioned such that one or both of the transformers' circumferential and/or radial planes are offset from one another. For example, FIGS. 1B and 1C show circumferential planes 40*a* and 20*a* which each bisect transformers 40 and 20 respectively. In addition, if FIGS. 1B and 1C are taken as a single view, this view shows circumferential planes 40*a* and 20*a* which are offset from each other. When the two planes are in alignment (i.e. coplanar) or substantial alignment then transformer 40 is essentially nested inside of transformer 20.

For example, if we consider that each of the transformers assumes the form of a solid of revolution which results from the rotation of a plane two-dimensional shape about an axis of revolution, then we can define a vertical plane that is aligned with and passes through the axis of revolution of the volume, i.e., radial plane 20*b*, and another plane that is perpendicular to the radial plane and which intersects, or passes through, a point on the surface of the plane two dimensional shape (e.g., the two dimensional shape's centroid), i.e., circumferential planes 20*a*, 40*a*. Then nested transformers may have substantially aligned radial planes but have their circumferential planes offset from one another by a distance. Similarly, the transformers may be nested but yet have neither plane aligned or may have substantially aligned circumferential planes while having offset radial planes. Therefore, in one embodiment where each of the transformers' radial and circumferential planes are in alignment with one another, the transformers are arranged concentrically. It should be noted that the transformers do not have to take the form of a solid of revolution but may also include forms as depicted, e.g., in FIGS. 9A and 9B (discussed below).

The embodiment shown in FIG. 1A comprises transformer (s) sensor(s) 15, a line interrupting circuit 345, which is associated with a line interrupting mechanism, a fault detector or fault detection circuit 340, and a reset circuit, which is associated with a reset mechanism. Essentially the line interrupting mechanism can comprise any one of a fault sensor 340, which can be essentially a transformer, an actuator such as solenoid 341, a plunger 342, and interruptible contacts 343. Other optional features for this line interrupting mechanism can include a test button, a reset button, and a latch for selectively latching or unlatching the contacts. Essentially the term latch, or latched indicates that the line side contacts are in electrical communication with the load side contacts and/or the face side contacts. When the device is reset this means that the contacts are in a latched position. The term tripped, or unlatched indicates that the line side contacts and/or the face side contacts are not in electrical communication with each other. When the device is in a tripped state, the contacts are unlatched. The actuator as described above can also be referred to as an electro-mechanical actuator because it is a solenoid.

Transformer(s)/Sensor(s) 15 can be one or more transformers and are configured to monitor a power line for any faults such as ground faults, arc faults, leakage currents, residual currents, immersion fault, shield leakage, overcurrent, undercurrent, overvoltage, undervoltage, line frequency, noise, spike, surge, and/or any other electrical fault conditions. In at least one embodiment shown in FIG. 1A, transformer or sensor 15 is any type of sensor configured to detect one or more of these electrical fault conditions. Examples of these sensors include arc fault sensors, ground fault sensors, appliance leakage sensors, leakage current sensors, residual current sensors, shield leakage sensors, overcurrent sensors, undercurrent sensors, overvoltage sensors, undervoltage sensors, line frequency sensors, noise sensors, spike sensors, surge sensors, and immersion detection sensors. In this embodiment, transformer or sensor 15 comprises sensors or transformers 20 and 40 shown in a nested configuration. Essentially, the nested transformers can be used with any known fault circuit configuration.

In at least one embodiment, sensor or transformer 40 is a differential transformer, while sensor or transformer 20 is a grounded neutral transformer.

However, in this embodiment there is a fault circuit having a line end 239 having a phase line 2341 terminating at contact 234, and a neutral line 2381 terminating at contact 238. In addition, there is a load terminal end 200 having a phase line 2361 and a neutral line 2101 each terminating at respective contacts 236 and 210. Contacts 210, 234, 236 and 238 can be in the form of screw terminals for receiving a set of wires fed from a wall. Each of these transformers 20 and 40 is configured to connect to a switching mechanism including a fault detector circuit 340 which can be in the form of an integrated circuit such as a LM 1851 fault detection circuit manufactured by National Semiconductor (R). While fault detector circuit 340 disclosed in this embodiment an integrated circuit, other types of fault detector circuits could be used such as microcontrollers, or microprocessors, such as a PIC microcontroller manufactured by Microchip (R). Fault detector circuit 340 is coupled to and in communication with transformer(s) sensor(s) 15 and is configured to read signals from transformer(s) sensor(s) 15 to determine the presence of a fault. This determination is based upon a set of predetermined conditions for reading a fault. If fault detector circuit 340 determines the presence of a fault, it provides a signal output from fault detector circuit 340 to the line interrupting circuit. Line interrupting circuit 345 is coupled to fault detector circuit 340 and comprises at least one line interrupting mechanism including an actuator such as a solenoid 341, including a plunger 342 which is configured to selectively unlatch a plurality of contacts 343 which selectively connect and disconnect power from line contacts 234, and 238 with load contacts 210 and 236, and face contacts 281 and 282 (See FIG. 1E).

Line interrupting circuit 345 can also include a silicon controller rectifier SCR 150 (See FIG. 1E) which is used to selectively activate actuator or solenoid 341.

Figure 1E:
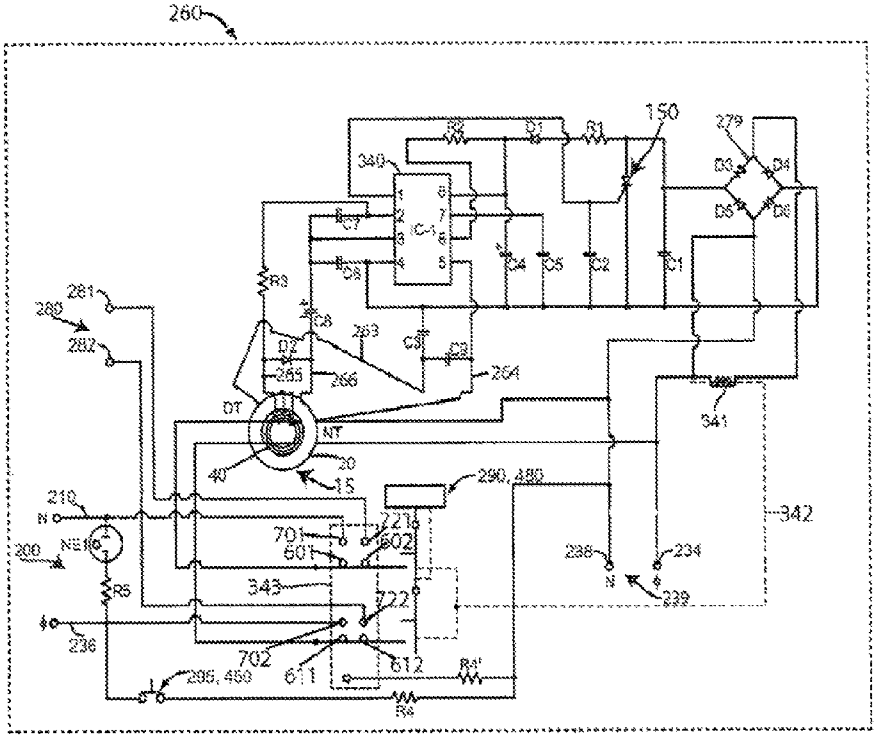
FIG. 1E is another schematic block diagram of a circuit incorporating nested transformers.

FIG. 1E shows a more particular embodiment 260 of the electrical device shown in FIG. 1A which shows that transformer(s) sensor 15 comprises at least one of transformer/sensor 20, or transformer/sensor 40, and additional circuitry including diode D2, resistor R3, capacitors C6, C7 and C8 coupled to transformer 20, and other additional circuitry including capacitors C3, C9 are coupled between sensor or transformer 40 and fault detector circuit 340.

Examples of non nested type fault circuit configurations can be found in greater detail in U.S. Pat. No. 6,246,558 to Disalvo et al. issued on Jun. 12, 2001 and U.S. Pat. No. 6,864,766 to DiSalvo et al which issued on Mar. 8, 2005 wherein the disclosures of both of these patents are hereby incorporated herein by reference in their entirety.

These two transformers, inner transformer 40 and outer transformer 20 can be configured such that inner transformer 40 is nested either partially, substantially, or entirely inside of outer transformer 20. Partial nesting is such that at least 1% of the depth of inner transformer 40 is nested inside of outer transformer 20. Substantial nesting results in that at least 51% of the depth of inner transformer 40 is nested inside of outer transformer 20. If transformer 40 is entirely nested inside of outer transformer 20 then 100% of the depth of inner transformer is nested within the depth of outer transformer 20. The depth of each transformer can be defined in relation to the direction taken along the center axis of the ring shaped transformer in a direction transverse to the radius of each transformer. From this perspective, even though the sensors or transformers are nested, one inside of the other, the sensors or transformers can also be aligned on different planes, such that a center axis or plane of a first transformer which is formed transverse to an axis formed along radius line of this transformer is on a different plane than a center axis or center plane of a second transformer which is also formed transverse to an axis formed along a radius line of the second transformer. This is seen from FIG. 4B as shown by bisecting lines 20*b* and 40*b* wherein if the transformers are on a different plane, bisecting line 20*b* is on a different level or plane than bisecting line 40*b*. In the case where the inner transformer 40 has a greater depth than the outer transformer, the outer transformer can be "nested" around the inner transformer such that with partial nesting between 1% and 51% of the depth of the outer transformer 20 overlaps with the depth of the inner transformer 40, while substantial nesting occurs when between 51% and 99% of the depth of the outer transformer 20 overlaps with the depth of the inner transformer 40. In addition, in this case, outer transformer 20 can be entirely nested when its entire depth overlaps with the depth of the inner transformer 40.

Figure 2A:
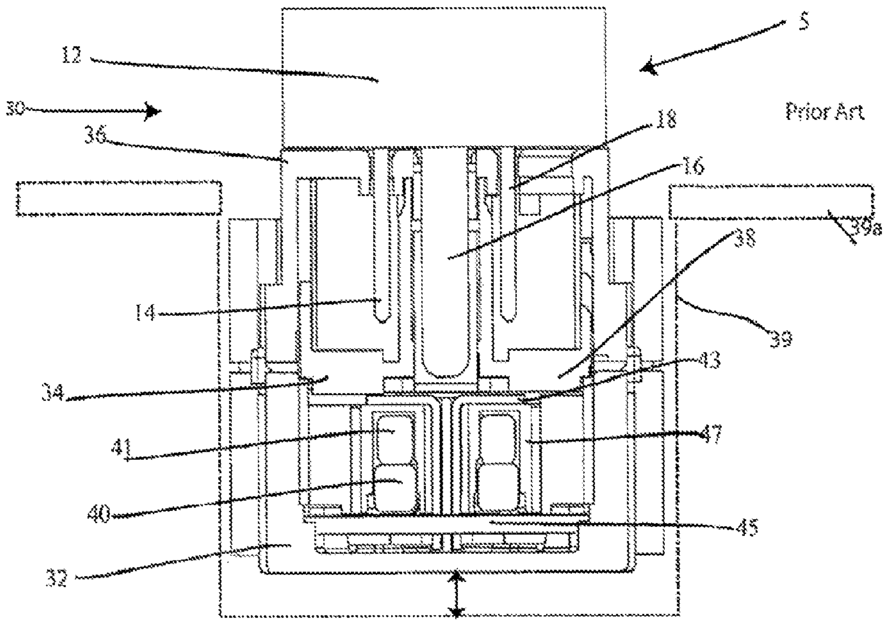
FIG. 2A is a side cross-sectional view of a fault interrupter having non nested transformers.
Figure 2B:
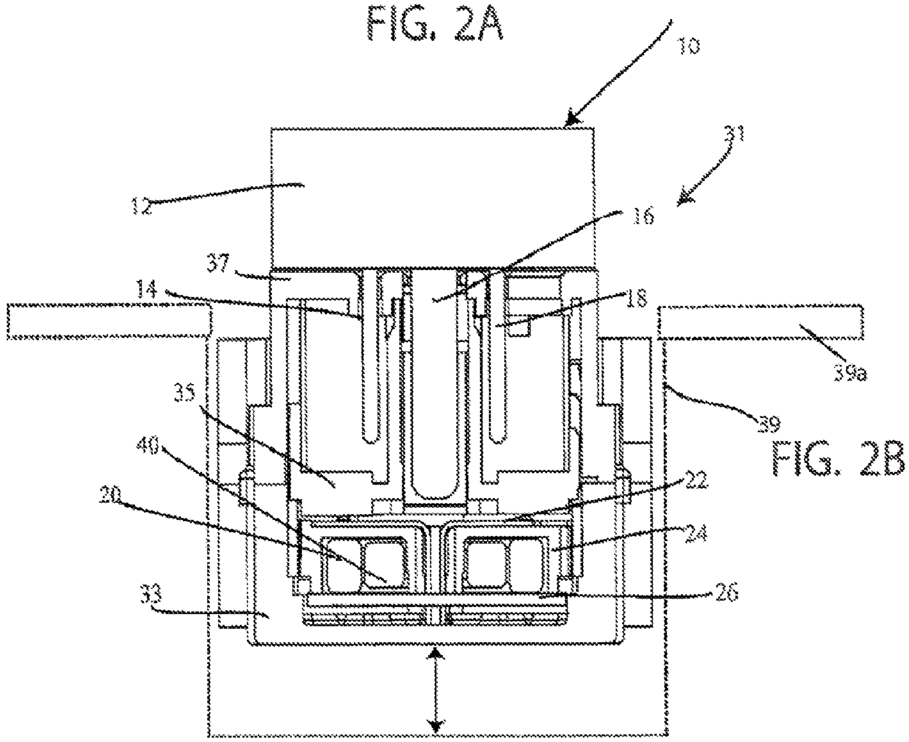
FIG. 2B is a cross sectional view of a fault interrupter having nested transformers.
Figure 10A:
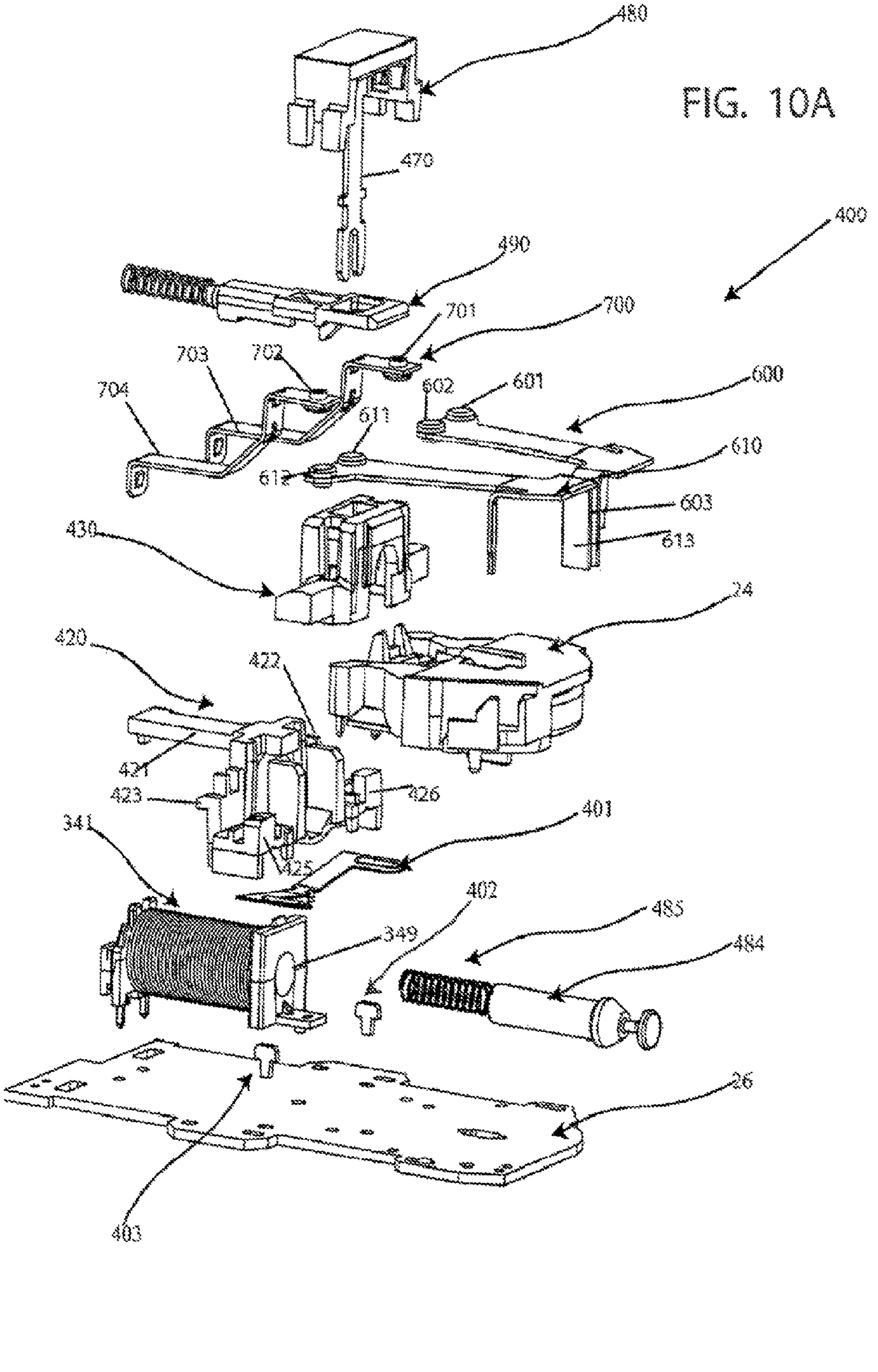
FIG. 10A is a drawing showing the exploded perspective view of a portion of a circuit interrupting device.

The electrical components shown in FIGS. 1A and 1E can be housed inside a housing such as the housings shown in either FIG. 2A or 2B and can be associated with the line interrupting mechanism, and reset mechanism associated with FIGS. 10A-23I. FIGS. 10A-23I can also have different circuitry not related to the circuitry shown in FIGS. 1A and 1E. With the design of FIGS. 10A-23I, contacts 343 (See FIG. 1E) include line side neutral contacts 601 and 602, line side phase contacts 611, and 612, load side neutral contact 701, and load side phase contact 702, as well as face side neutral contact 721, and face side phase contact 722. Contacts 601, 602, 611, 612, 701, and 702 are shown in FIG. 10A as bridged contacts. That is, when these contacts are latched, these bridged contacts form three conductive paths in a connection region that are in electrical communication with each other. In at least one embodiment, the bridged contacts are on substantially the same plane. When these contacts are latched, power is provided from the line side 239 to the load side 200 and to the face side 280. When contacts 601, 602, 611, and 612 move away from contacts 701, 721, 702, and 722, power is removed from load side 200 and face side 280.

FIG. 2A is a cross sectional view of the current state of the art comprising an assembled stacked prior art version of a set of transformers (i.e., non-nested). As depicted, these transformers are designed to rest one on top of the other such that transformer 41 rests on top of transformer 40. These transformers are disposed inside of an outer housing 30 which is comprised of a first part of an outer housing 32, a second part of a housing 34, and a third part of an outer housing 36. The first part of the outer housing 32 forms a backing or back cover, the third part of outer housing forms a front section or front cover while the second part of the outer housing 34 forms a divider or middle housing, dividing the opening or cavity for receiving plug prongs, 14, 16, and 18 from an inner housing 47 for housing transformers 40 and 41.

Additionally, as seen in FIG. 2A, conductors 43 are disposed inside of outer housing 30 and extend into the inner housing or transformer bracket 47. These conductors are phase or neutral conductors and extend out to a position outside of the housing to form means for attaching to a line side wire. For example, there is also a side contact 51 (See FIG. 4A) connected to conductor 43, which is configured to form a power contact for contacting a power line.

There is a magnetic shield 49 (See FIG. 4A) disposed inside of this outer housing wherein this magnetic shield 49 is designed to increase the sensitivity of the differential transformer. This magnetic shield could be coupled to circuit board 45, which rests inside of the first part of the outer housing 32. The device 5, shown in FIG. 2A is shown by way of example as installed in a wall box such as a single gang wall box 39, which is installed adjacent to a wall such as wall 39*a*.

FIG. 2B shows an improved version of a device 10 which has nested transformers 20 and 40. This cross-sectional view includes a view of plug 12 having prongs 14 and 18 along with ground prong 16 inserted into the device. There is an outer housing 31 having a first housing part 33, a second housing part 35, and a third housing part 37. First housing part 33 forms a backing or back cover, second housing part 35 forms a divider or middle housing, while third housing part 37 forms a front cover. As can be seen in this view, second or inner transformer 40 is nested inside of an inner volume, or inner hole region, of outer transformer 20. These transformers 20 and 40 rest above a circuit board 26 and are housed inside of a housing 24 which is configured to provide a housing for two nested transformers. In addition, a plurality of conductors 22 extend up from circuit board 26, around housing 24 so that these conductors can contact outer contacts such as contacts 234 and 238 at line terminal end 239 (See FIG. 1A). While the inner transformer 20 and outer transformer 40 can be any one of a differential transformer or a grounded/neutral transformer in at least one embodiment, the inner transformer 40 is a differential transformer, while the outer transformer 20 is a grounded/neutral transformer. The device 10 is shown by way of example as being installed in a wall box such as a single gang wall box 39. Thus, in this case, if the device is installed into a single gang wall box, a substantial portion of the device would extend behind a wall, such as a drywall or plasterboard wall 39*a*.

Figures 3A, 3B:
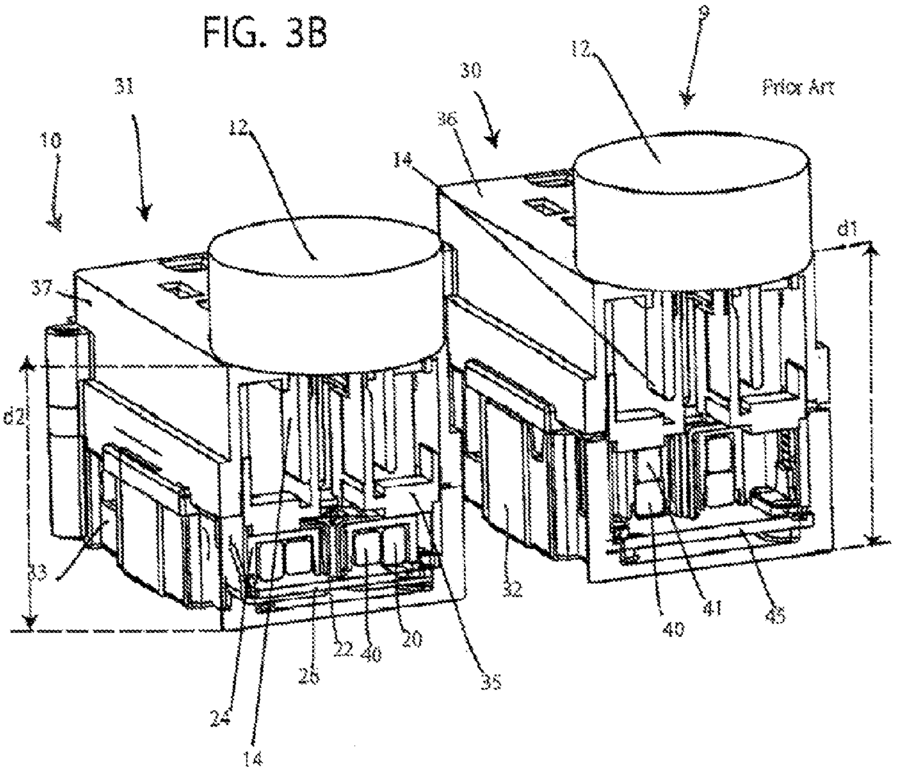
FIG. 3A is a front perspective cross sectional view of a fault interrupter having non-nested transformers.
FIG. 3B is a front perspective cross-sectional view of a fault interrupter having nested transformers.

FIGS. 3A and 3B show a front perspective cross-sectional view of the respective configurations shown in FIGS. 2A and 2B. FIG. 3A is the prior art view while FIG. 3B is the design associated with at least one embodiment of the invention. These views show the dimensional difference between housing 30 of device 9, and housing 31 of device 10. In this case, a depth dI is shown for device 9 which includes the entire distance from a back face of back cover 32 to a front face of front cover 36. In addition depth d2 is shown extending from a back face of back cover 33 to a front face of front cover 37 of housing 31. The size difference between these two housings, or differences in depths dI and d2 is approximately similar to the height dimension of a transformer and its associated windings. (See FIG. 8). Thus, the design of device 10 with depth d2 is shallower than the design of device 9 with depth dI. This is because the two transformers 20 and 40 are nested, one inside of the other, with the outer housing depths being configured accordingly. Thus, once these transformers are nested, one way to shorten the depth would be to shorten the depth of front cover 37 relative to the depth of the front cover 36 in device 9. Another way to shorten the depth would be to shorten the depth of back cover 33 relative to back cover 32 in device 9. Still another way would be to shorten the depths of both front cover 37 and back cover 33 of device 10 relative to front cover 36 and back cover 32 of device 9. However, since a receptacle (e.g., a duplex receptacle) must be configured to receive plug prongs/blades as defined by relevant electric standards and/or governmental agency codes, adjustability of the depth of the device is practically limited by the depth of such prongs/blades.

Figure 4A:
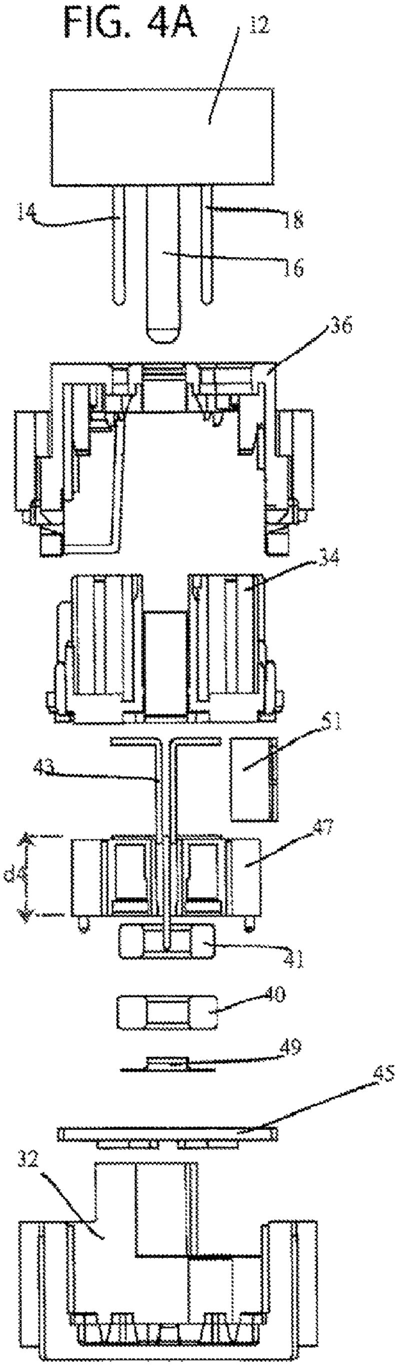
FIG. 4A is a front cross-sectional exploded view of a fault interrupter having non nested transformers.
Figure 4B:
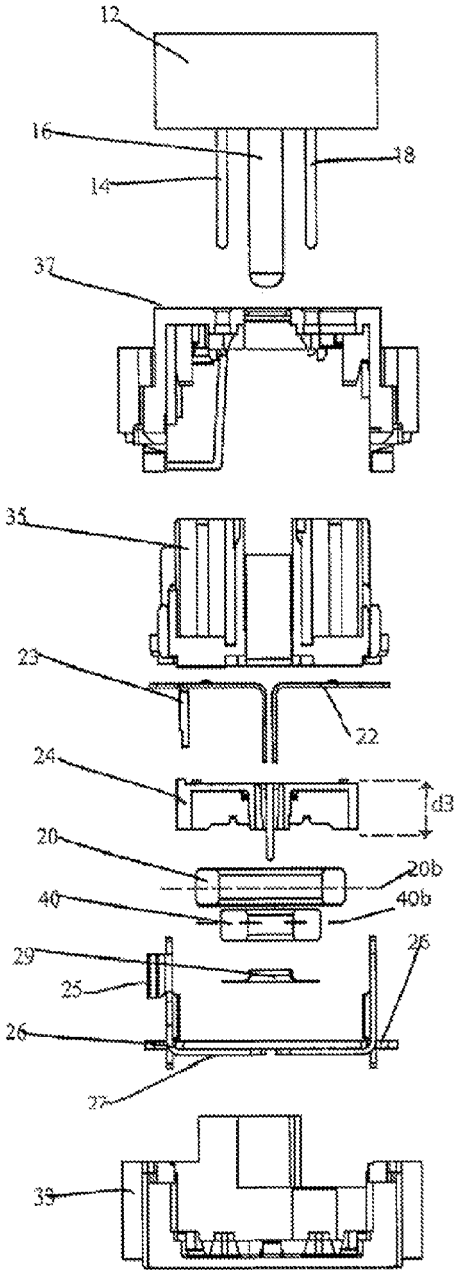
FIG. 4B is a front cross-sectional exploded view of a fault interrupter having nested transformers.

FIGS. 4A and 4B are different views of the designs shown in FIGS. 2A and 2B and 3 A and 3B. For example, FIG. 4A is an exploded cross sectional view of the prior art device 9. However, FIG. 4B is the exploded cross-sectional view of the device according to one embodiment of the invention. In this view, there is shown housing 24, which is the interior or inner housing for housing transformers 20 and 40. The space saving design which was shown in FIGS. 2B and 3B, can also be seen as saving space via housings 24 and 47. For example, housing 24 has a depth of d3 which as can be seen is less than depth d4 of housing 47. This is because housing 24 is designed to accommodate approximately the distance of the depth of a single ring or transformer. However, as shown with device 9, housing 47 has a depth d4 which is configured to accommodate at least two transformers such as transformers 40 and 41 stacked one on top of the other. Therefore, the reduced space required for housing 24, vs. housing 47 allows for a shallower type device such as a device with less depth. In addition, this view also shows electrical conductors 25 which are coupled to circuit board 26, by extending across a surface of circuit board 26, opposite the surface of circuit board 26 which receives transformers 20 and 40. On the surface of circuit board 26 that receives transformers 20 and 40, is a magnetic shield 29 which in many cases is actually a metal part. Its function is to increase the sensitivity of the differential transformer. It fits over a structure having geometry on transformer housing 24 in the form of connector 246 (See FIGS. 6B, 6C) and will be part of the transformer bracket subassembly; i.e. it does not attach directly to the circuit board 26. Magnetic shield 29 can be made from any suitable material such that it provides a magnetic shield and is configured to be coupled to circuit board 26 and to also house transformers 20 and 40 concentrically on circuit board 26. On the side of the circuit board opposite the transformers 20 and 40, there is an electrical conduit 27 which is configured to provide power between circuit board 26 and contacts such as contact 25 which is representative of contacts 234, 238, 236, or 210 (See FIG. 1A). Circuit board 26 can be powered by conductors 25 or 27 wherein conductor 27 provides power to conductor 23.

Figure 5A:
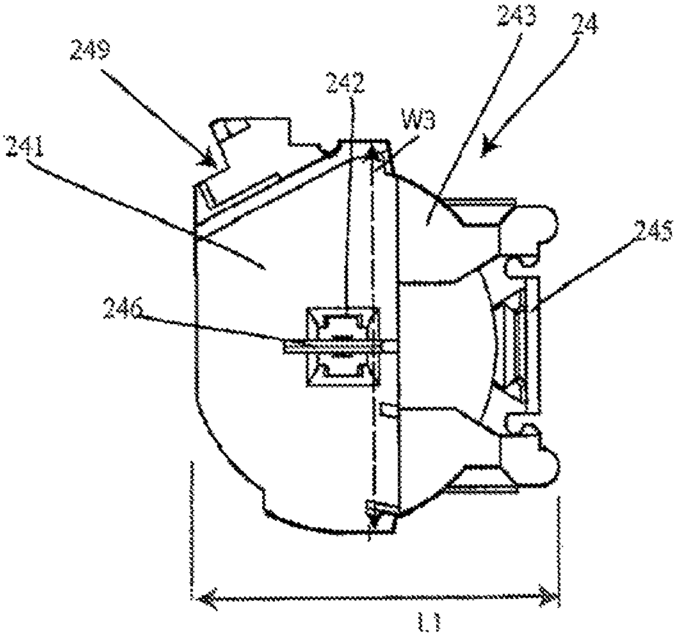
FIG. 5 A is a top view of a housing for the nested transformers.
FIG. 5B is a bottom view of a housing for the nested transformers.
Figure 5B:
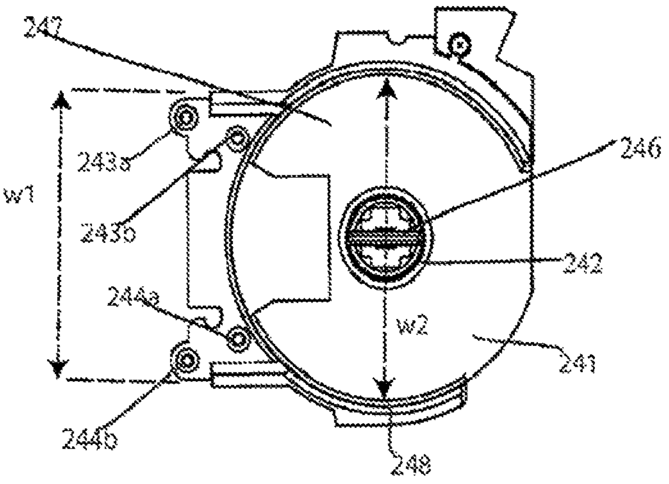

Housing 24 is shown in greater detail in FIGS. 5A, 5B, 6A, 6B, and 6C. For example, housing 24 includes a first surface 241, and a center hole or opening 242 in first surface 241. There is a connector 246 which extends through hole 242, wherein connector 246 has a flared end to contact first surface 241 and secure housing 24 to a circuit board. For example, FIG. 5B shows an underside of the housing with an inner recessed region 247 forming a ring shaped interior region shown opposite first surface 241. This underside region is a recessed region that is substantially ring shaped and is bounded by first surface 241, connector 246 in a center region, and outer side walls 248 (See FIGS. 6A-6C). In addition, with this view, contact pins 243*a*, 243*b*, 244*a* and 244*b* are coupled to housing 24 wherein in this region, housing 24 is shown as extending across a width wI, wherein this width is designed to fit on a circuit board such as circuit board 26. In addition, this underside shows an open region having a width w2 which has an opening sufficient to receive at least two nested transformers housed inside.

Figure 6A:
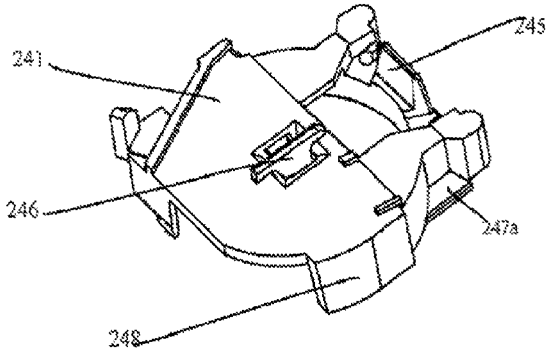
FIG. 6A is a top perspective view of a housing for nested transformers.

FIG. 6A shows a top perspective view of housing 24, which shows surface 241, side walls 248, and connector 246. In addition, this view also shows extending element 245 which forms a back wall for plunger, and forms a barrier between transformers/sensors 20 and 40 and the plunger.

Figure 6B:
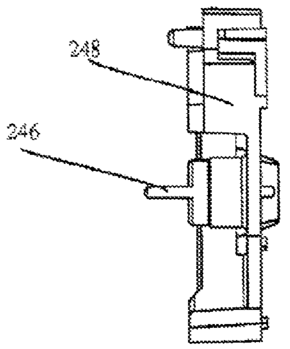
FIG. 6B is a first side view of the housing of FIG. 5A.
Figure 6C:
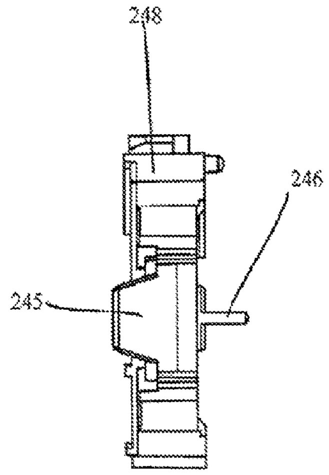
FIG. 6C is a second opposite side view of the housing of FIG. 5A.

In addition, FIGS. 6B and 6C show connector 246 extending through the depth of this housing.

FIGS. 7A, 7B, 7C, and 7D show the connection of housing 24 to circuit board 26 with connector 246 extending through to circuit board 26. With this design, circuit board 26 includes notched or recessed regions 261 and 262 which form cut outs to receive contacts or terminals such as terminals 249 (See FIG. 7E) to electrically connect the device to a power line. In this case, disposed on circuit board 26, are contacts 263, 264, 265 and 266, wherein contacts 263 and 264 are disposed adjacent to recessed region 261, while contacts 265 and 266 are disposed adjacent to recessed region 262. These contacts have to be positioned in and adjacent to recessed regions 261 and 262 because housing 24 has a greater length LI (FIG. 5A) than the other housing 47 of the design of FIG. 2A. This is because transformer 20 is configured as larger than transformer 40.

Thus, for all of these components to fit on the circuit board, housing 24 has a base width w3 which is defined by the outer regions of side walls 248, and an inner width wI which is defined by the outer edges of arms holding pins 243*a* and 244*b* (FIG. 5B), so that this portion of housing 24 can fit between outside conductors 25 and terminal screws 249.

Figure 7E:
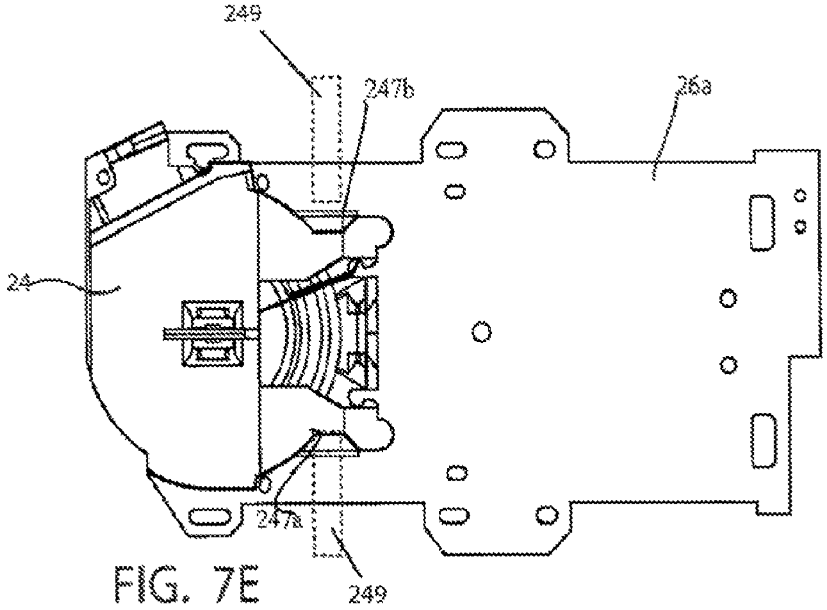
FIG. 7E is a top view of a second embodiment of the circuit board coupled to the housing of FIG. 5A.
Figure 7F:
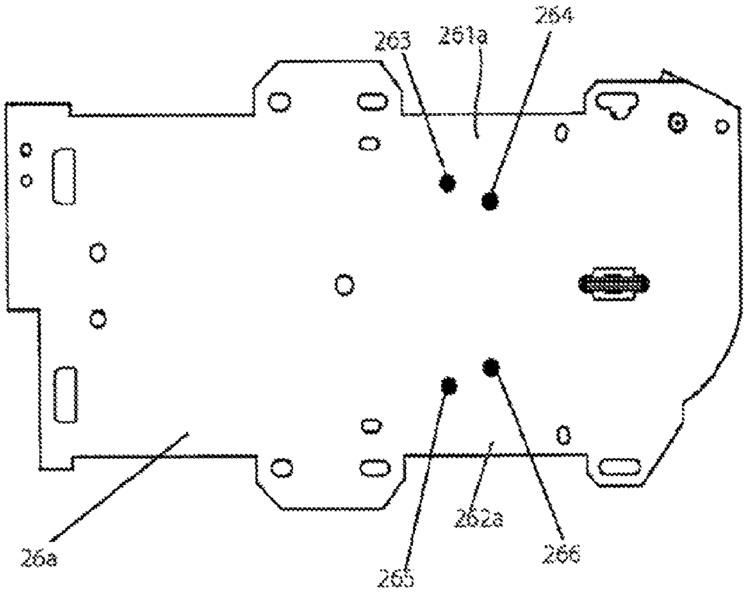
FIG. 7F is a bottom view of the embodiment shown in FIG. 7E.

FIGS. 7E and 7F show an alternative embodiment of a circuit board 26*a* which does not have indents in the circuit board but rather non indented regions 261*a* and 262*a*. Rather, the indented regions 247*a* and 247*b* are positioned in housing 24 and are configured to allow terminal screws or contact pins 249 to insert therein. Therefore, these indented regions 247*a* and 247*b* are configured to allow the terminal screws 249 to be screwed into the housing. These terminal screws are used to form terminal contacts such as contacts 234 and 238 and 210 and 236 (See FIG. 1A) for connecting to electrical lines.

FIGS. 7G-7J disclose a series of different views of another embodiment including a transformer housing 24 coupled to a circuit board 26*b*. Circuit board 26*b* is different from circuit board 26 in that it has a cut-out region allowing at least a portion of transformer housing 24 to be positioned in this cut out region of circuit board 26*b* such that at least a portion of transformer housing 24 occupies this cut out region. This positioning of transformer housing 24 within the cut-out region of circuit board 26 allows for a further depth reduction of the device. While transformer housing 24 is mechanically coupled to circuit board 26*b* in any known manner such as via a mechanical fastening or an adhesive, contacts 243*a*, 243*b*, 244*a*, and 244*b* are electrically coupled to circuit board 26*b* via respective lines 253*a*, 253*b*, 254*a*, and 254*b*.

Indented regions 247*a* and 247*b* shown in FIGS. 7C, and 7E, are formed by housing 24 to allow terminal screws 249 to be inserted into the outer housing 31 and to allow terminal screws to intrude into outer housing 31. Because sensor housing 24 extends into the region where terminal screws 249 intrude, sensor housing is dimensioned so as to provide indented regions 247*a*, and 247*b* to receive these terminal screws 249.

Figure 8:
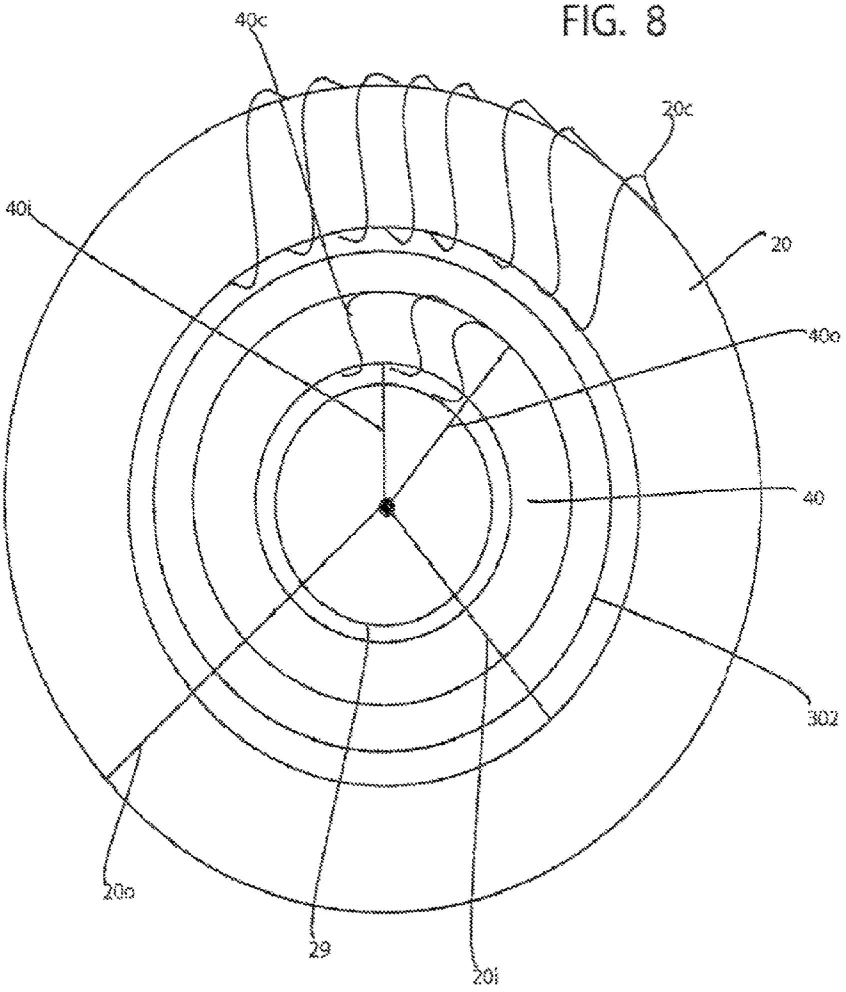
FIG. 8 is a top view of two transformers in a circular shape.

FIG. 8 shows a first embodiment of a sensor comprising transformers 20 and 40 having associated coils 20*c* and 40*c* formed by windings of a wire such as a copper wire. Transformer 20 is ring shaped and has an inner radius 20*i* which defines an inner hollow region bounded by an inner ring for receiving transformer 40. Transformer 20 also includes an outer radius 20*o* which defines the outer boundary for this transformer. In addition, transformer 40 has an outer radius 40*o* which defines the outer boundary for this transformer and which is smaller than the inner radius 20*i* of transformer 20. Because inner radius 20*i* is larger than outer radius 40*o* this allows for the nesting of transformer 40 inside of transformer 20 in the hollow region of transformer 20. This nesting occurs when transformer 40 enters this inner hollow region bounded by inner radius 40*i*.

Transformer 40 also has an inner radius 40*i* which crosses a hollow region for receiving other parts. While only a few coils or windings are shown, essentially, the coils wrapped around these transformers would extend entirely around the transformer. Transformer 20 has a different number of windings than transformer 40. For example, transformer 20 (neutral transformer) can have a little more than 100 windings, while transformer 40 (differential) can have approximately 800 windings. To keep the resistance of the windings substantially the same, depending on the size of the transformer, the size of the wire diameter must be changed when the size of the transformer is changed. Therefore, in one embodiment transformer 20 is made larger than transformer 40, therefore, the wire diameter of the windings of this transformer are increased relative to the wire diameter of the windings of a transformer such as a grounded neutral transformer which is sized similar to transformer 40. However, because transformer 20 is larger than transformer 40, more copper wire is used for transformer 20 than for transformer 40. In addition, as shown in this view, there is a magnetic shield 29 disposed inside of an inner region of transformer 40. Furthermore, there is also an additional insulating ring 302 comprising an intermediate ring disposed between the coils of 40*c* of transformer 40 and the coils 20*c* of transformer 20 so that these coils are electrically and mechanically isolated from each other while still being magnetically coupled to each other. Insulating ring 302 can be in the form of a RTV insulator or any other type of dielectric barrier such as rubber, plastic, plant fiber, or ceramic. While in this embodiment, the size of the outer transformer is shown as increased to form an inner region to accommodate a standard sized inner transformer such as a differential transformer, it is also possible to start with an existing sized outer transformer in the form of a grounded neutral transformer with a reduced sized differential transformer being disposed inside the outer transformer.

While transformers 20 and 40 as shown in FIG. 8 are substantially circular, FIG. 9A shows another embodiment of the transformers which show transformers 310 and 312 which are substantially oval. As shown, transformer 312 is nested inside of transformer 310. These transformers 312 and 310 are shaped differently but also work substantially similar to transformers 20 and 40 as well. Alternatively, FIG. 9B shows another set of transformers which are substantially square shaped with transformer 324 being nested or disposed inside of a hollow region of transformer 320.

There is also a process for reducing the depth of a fault circuit interrupter device. In this case, the process starts with a first step which includes positioning at least one transformer at least partially inside of another transformer to form a nesting configuration. Next, in a second step, these two nested transformers are electrically coupled to a circuit board. These nested transformers are electrically coupled to the circuit board via lines as shown by schematic electrical diagram in FIG. 1. Next, in another step, a transformer housing such as transformer housing 24 is coupled to the circuit board 26 so as to house these two transformers adjacent to the circuit board. The dimensions of this transformer housing are configured so that it can house two different transformers in a nested configuration while still fitting on a standard circuit board for fault circuit interrupters. This means that the housing would have a particular recess width wI to couple to a circuit board while still having a sufficient opening width w3 to fit at least two transformers therein. Next, in the next step the outer housing can be configured such that it has reduced depth due to the depth savings by nesting the two transformers. Thus, this design would result in improved space savings by nesting two transformers together, rather than stacking these two transformers one on top of the other.

The device described above can be used with an actuating mechanism disclosed in FIGS. 10A-23I. For example FIG. 10A discloses an exploded perspective view of the activating mechanism which includes a circuit board 26 as disclosed above. In addition, there is an actuator or solenoid 341 coupled to circuit board 26 via pins. An auxiliary test arm 401 is coupled to solenoid 341 above contact pins 402 and 403 which are coupled to circuit board 26. Auxiliary test arm 401 is comprised of a leaf spring made of for example a bendable metal such as copper. When auxiliary test arm 401 is pressed down by a lifter under influence by a reset button (not shown) the contact between test arm 401 and contact pins 402 and 403 forms a closed circuit which allows for the testing of a fault circuit interrupter such as fault circuit 340 and solenoid 341. A pin or plunger 484 is insertable into solenoid 341 such that it is selectively activated by solenoid 341 when the coil on solenoid 341 receives power.

While many different types of springs are described herein, such as springs or arms 401, test spring 457, (FIG. 15C) reset spring 471 (FIG. 16E), plunger spring 485 (FIG. 10A), and trip slider spring 499*a* (FIG. 17E), different substitutable springs can be used in place of the springs shown. For example, when referring to a spring, any suitable spring can be used such as a compression spring, a helical spring, a leaf spring, a torsion spring, a Belleville spring, or any other type spring known in the art.

Figure 10B:
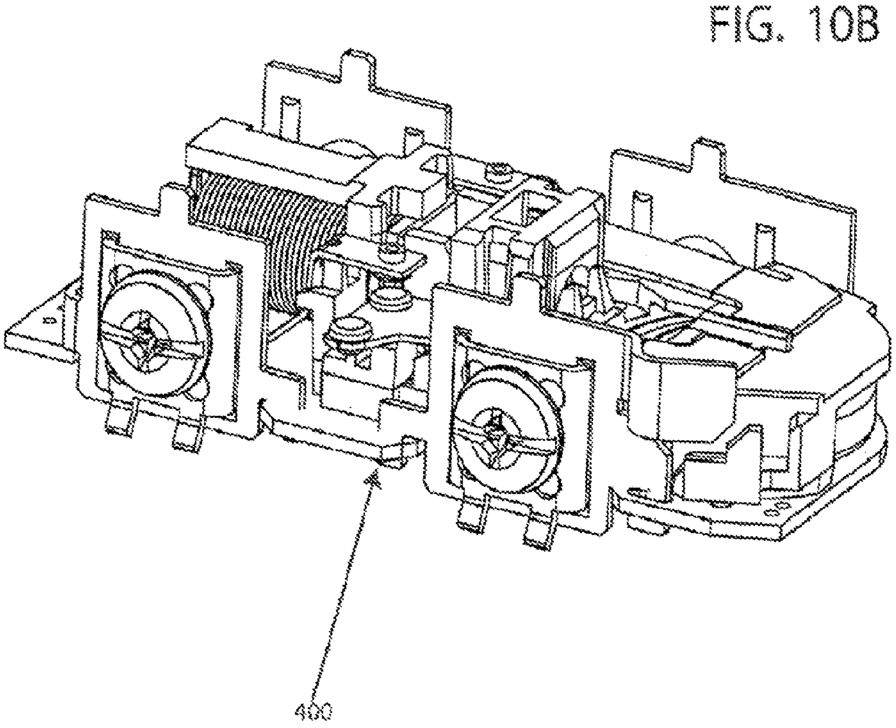
FIG. 10B is a perspective view of an assembled version of the device shown in FIG. 10A.

A load movable arm support 420 is positioned above auxiliary test arm 401 and is used to support load arm conductors 703 and 704 via arms 422 and 423. In addition, arms 425 and 426 support line arm conductors 610 and 600. Support 420 has an insulating tab section 421 which can be coupled over solenoid 341 to insulate the windings of solenoid 341 from the remaining components. In addition, disposed adjacent to solenoid 341 on circuit board 26 is transformer housing 24. Lifter assembly 430 is slidable between load movable arm support 420 and housing 24 and is substantially positioned between line neutral movable assembly 600, line phase movable assembly 610 and load movable assembly 700. In this case, line neutral movable assembly 600 has at one end bridged contacts in the form of contacts 601 and 602 which are positioned on a substantially similar or the same plane, and which are configured to selectively couple to load movable assembly 700. Load movable assembly 700 includes load neutral movable contact 701, and movable conductor 703, and load phase movable contact 702 and load movable conductor 704. All of these assemblies are in the form of metal conductors which act as leaf springs and which can be brought into selective contact with each other via the movement of lifter 430. There are also face contacts (not shown) which are stationary contacts coupled to middle housing 437 (See FIG. 14D) which are for example coupled to face terminals 281, and 282 in the embodiment shown in FIG. 1E. Similarly, while the embodiment shown in FIG. 10B is not limited to the configuration of the embodiment shown in FIG. 1E, FIG. 1E shows an example of the electrical configuration between these contacts via contacts 343. Thus, the contacts 601 and 602 are connected to the line side neutral contact 238, while contacts 611 and 612 are shown connected to line side phase contact 234. With the embodiment shown in FIGS. 10A and 10B, when lifter 430 is acted on by a spring 471 of reset button 480, (FIG. 16E) it pushes up conductors 600 and 610 to first contact load movable conductors 703 and 704 and then push these load movable assemblies 700 further, so that contacts 601 and 612 next contact face contacts 721 and 722 which are positioned in a stationary manner in middle housing 437. (FIG. 14D) This movement is described in greater detail in FIGS. 21A, 21B, 21C, 22A, and 22B.

FIG. 10B shows a perspective view of the device forming an assembled body 400. Assembled body 400 is assembled by first inserting pins 402 and 403 (See FIG. 10A) into circuit board 26. Next, solenoid 341 is placed into circuit board 26. Once solenoid 341 is coupled to circuit board 26, test arm 401 is coupled to solenoid 341 by inserting tab 411 into an associated hole on tab 347 (See FIGS. 11 and 12A). Next, load movable support 420 is placed on top of solenoid 341, such that tab 421 covers the windings of solenoid 341 to provide a shield. Next, plunger spring 485 is positioned inside of hole 349 on solenoid 341. Once plunger spring 485 is positioned inside of solenoid 341, plunger 484 is placed inside of solenoid 341 as well. Next, plunger 484 is pressed inside of solenoid 341 to compress plunger spring 485 and allow room for inner housing or transformer housing 24 to be coupled to circuit board 26. Next, lifter assembly 430 is placed on board 26 between transformer housing 24 and solenoid 341. In this case, lifter 430 should be orientated so that the open part of a latch plate 500 (See FIG. 18B) is facing solenoid 341. Next, line movable arms 600 are inserted into transformer housing 24 such that a section of these arms 603 and 613 extend through a center region of housing 24. Next, load movable assembly 700 is coupled to circuit board 26 and to load movable support 420. Next, a metal oxide varistor (not shown) is coupled to transformer housing 24 and then coupled to circuit board 26. Next, the line and load terminal assemblies (See FIG. 10B) is coupled to circuit board 26 to form assembly 400 shown in FIG. 10B.

Figure 11:
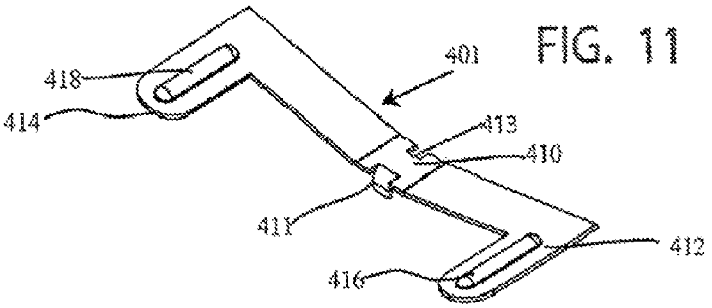
FIG. 11 is a perspective view of a test arm shown in FIG. 10A.

FIG. 11 is a top perspective view of a test arm 401 including a locating section 410 which comprises a locating cut out 413 and a locating tab 411. There are arms or wings 412 and 414 coupled to the locating section 410 which extend out in an L-shaped manner. There are also stiffening extrusions 416 and 418 disposed in each of these wings 412 and 414. Locating section 410 is configured to selectively couple to an associated tab 347 on solenoid 341 shown in FIG. 12A.

Figure 12A:
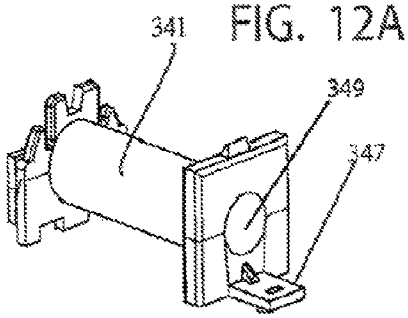
FIG. 12A is a first perspective view of an actuator shown in FIG. 10A.
Figure 12B:
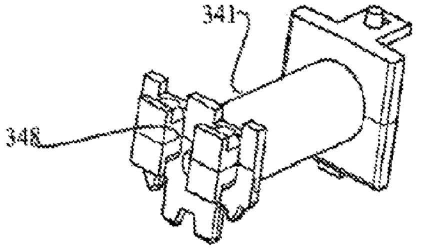
FIG. 12B is a second perspective view of the actuator.
Figure 12C:
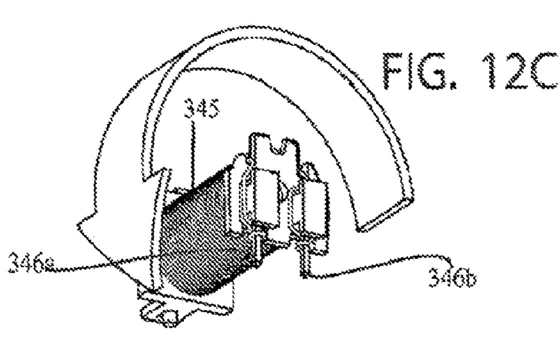
FIG. 12C is a perspective view of the actuator having windings.
Figure 13A:
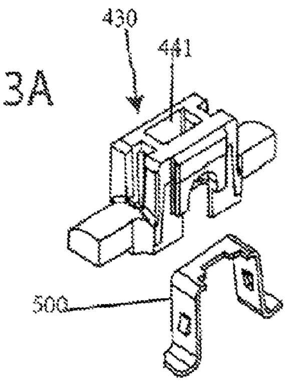
FIG. 13A is a front perspective view of a lifter showing a latch plate which can be inserted inside.
Figure 13B:
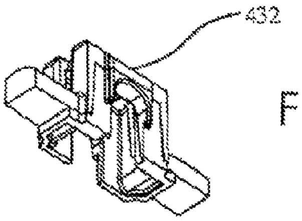
FIG. 13B is an opposite side bottom perspective view of the lifter.
Figure 13C:
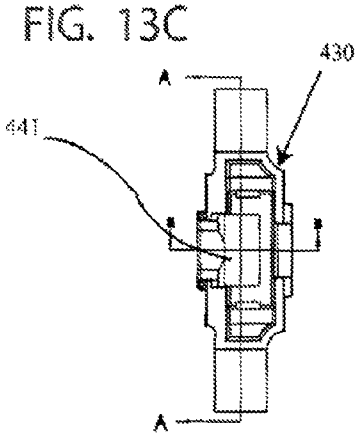
FIG. 13C is a top view of the lifter showing cross sectional cut-out lines A-A and B-B
Figure 13D:
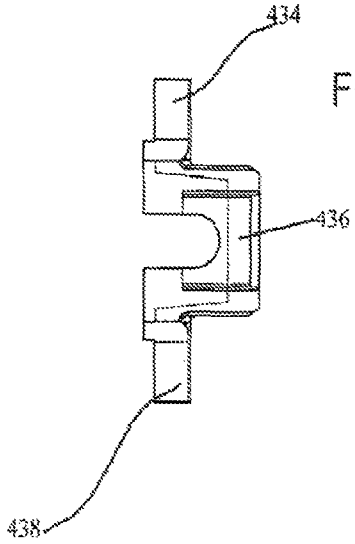
FIG. 13D is a side view of the lifter.
Figure 20A:
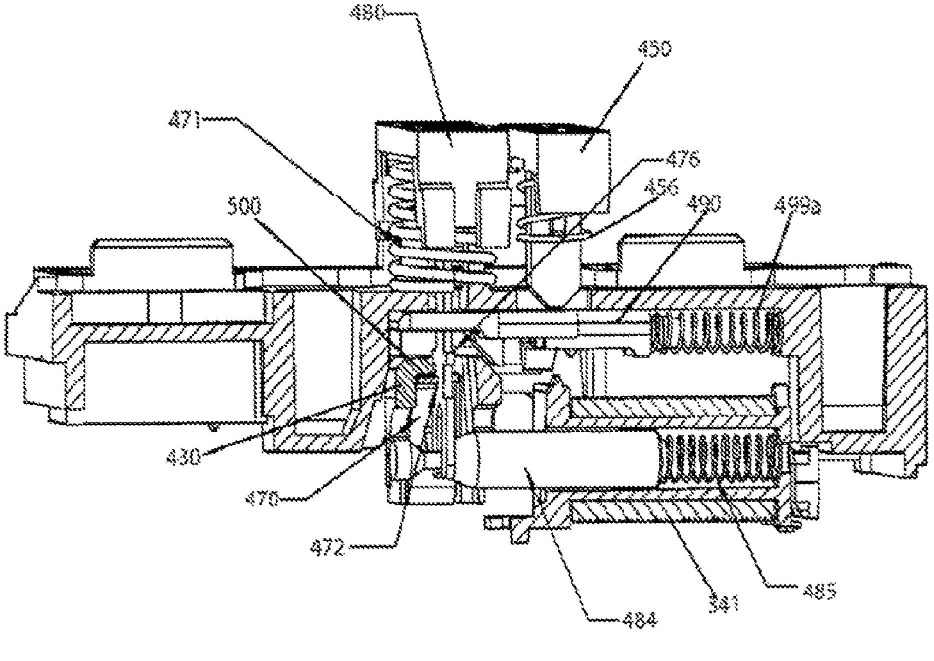
FIGS. 20A-20E are the various positions for the mechanism of operation.

FIG. 12A discloses a side perspective view of a one actuator or solenoid 341. In this view there is a connection tab 347 which is used to receive tab 411 of locating section 413, this view also discloses this device having an inner tube section for carrying a plunger 484 (See FIG. 16D) and a plunger spring such as plunger spring 485 as shown in FIG. 20A. FIG. 12B shows a back end support block 348 coupled to solenoid 341. FIG. 12C discloses windings 345 which wind around the body solenoid 341 thereby forming an actuator, wherein these windings begin and end at posts 346*a* and 346*b*. Posts 346*a* and 346*b* are coupled to circuit board 26 to form an electrical connection. FIG. 13A discloses a top perspective view of a lifter 430 while FIG. 13B discloses an opposite perspective on a perspective view of lifter 430. Lifter 430 has a bobbin side 432 and an angled face 439 on this bobbin side 432. (See FIG. 13F) In addition, disclosed adjacent to lifter 430 is a latch plate 500 (See FIG. 18B). Lifter 430 has arms 434 and 438 as well as cutouts 440 and 441. Cut outs 440 and 441 are configured to receive different components such as either a latch plate 500 or plunger 484. For example, the plunger 484 is configured to extend through cut out or hole 440 while the latch is configured to extend through hole 441. This lifter 430 located between load movable support 420 and housing 24 and is configured to move up and down depending on whether it is actuated by a reset button 480 and the latch, such that the latch would extend through the hole 441 and have catch arms or latch tabs 476 (See FIG. 16B) which catch latch plate 500 inside of lifter 430 and lift this lifter up. The lifting of this lifter would lift arms 434 and 438 up, lifting conductors 600 and 601 up to form a closed circuit with load conductor assembly 700 to form a closed circuit with contacts 280 and 200.

FIG. 14A shows the top perspective view of a front cover 443 having a test button opening 444 and a reset button opening 445. In this embodiment, there is also an optional window or cut out 443*a* which is used to allow visual tracking of trip slider 490. In addition, FIG. 14B discloses a bottom perspective view of the middle plate 437 or housing having a trip slider cavity 446 and a guide wall 447 disposed adjacent to cavity 446. There is also a snap 448 for coupling to the trip slider to allow the trip slider 490 (See FIG. 17A) to be assembled into the housing, and a cut out 449 for the latch 470 (See FIG. 16B). There is also a cut out 442 for the test button-ramp as well. FIG. 14C also shows these features as well. FIG. 14D shows an opposite side view of this middle plate as well, which show tabs 437*a* which are used to couple and to support a spring such as reset spring 471.

FIG. 15A shows a top perspective view of a test button 450 having arms 452 and 456 having locking tabs each having a lead which is designed to allow this device to snap into the face cover 443, through opening 444. There is also a center arm 454 having a double-sided ramp including ramps 455*a* and 455*b*. FIGS. 15B and 15C also show some of these features. The ramps are for interacting with the ramp 494 on trip slider 490 (See FIG. 17E) to cause trip slider 490 to move axially in a direction transverse to the direction of the movement of the test button.

Figure 16A:
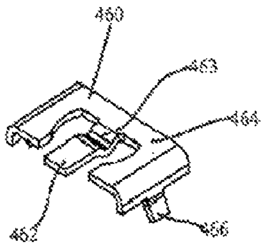
FIG. 16A is a top perspective view of a latch clasp.
Figure 16B:
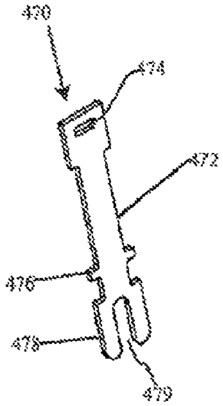
FIG. 16B is a side perspective view of a latch.
Figure 16C:
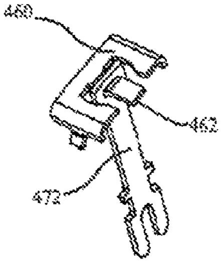
FIG. 16C is a side perspective view of the latch coupled to the latch clasp.
Figure 16D:
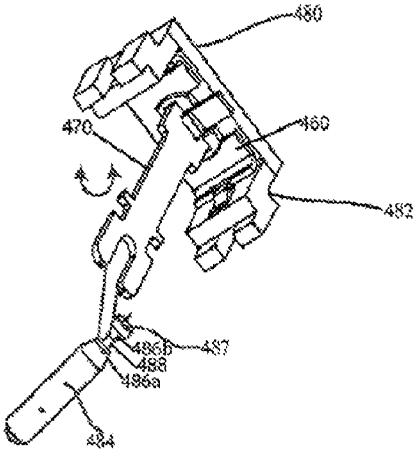
FIG. 16D is a bottom perspective view of the latch clasp coupled to a reset button.
Figure 16E:
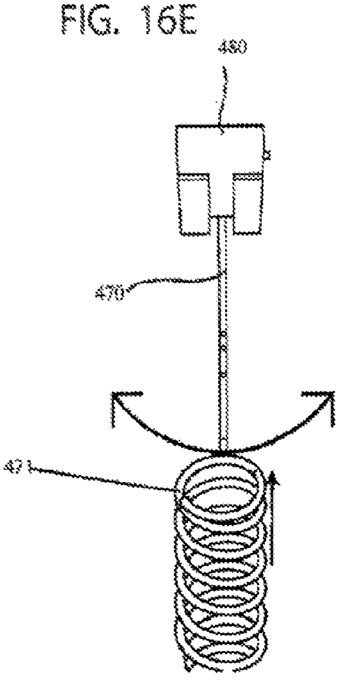
FIG. 16E is a side view of the latch coupled to the reset button.
Figure 17A:
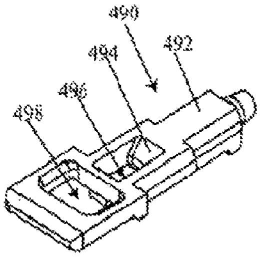
FIG. 17A is a top perspective view of a trip slider.
Figure 17B:
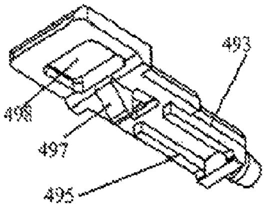
FIG. 17B is a bottom perspective view of a trip slider.
Figure 17C:
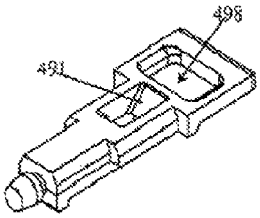
FIG. 17C is another top perspective view of a trip slider.
Figure 17D:
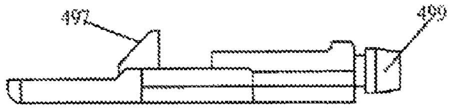
FIG. 17D is a side view of a trip slider.
Figure 17E:
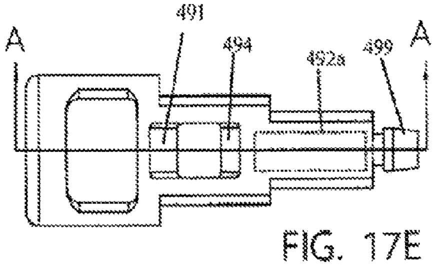
FIG. 17E is a top view of a trip slider.
Figure 17F:
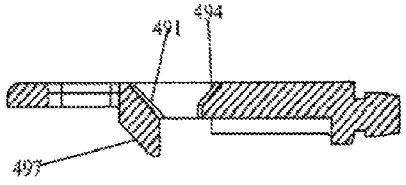
FIG. 17F is a side cross-sectional view of a trip slider taken along the line A-A in FIG. 17E.
Figure 17G:
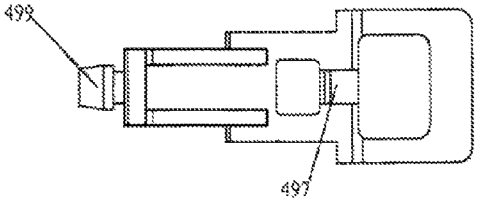
FIG. 17G is a bottom view of the trip slider.

FIG. 16A discloses a top perspective view of a latch clasp 460 having a bearing surface 463 for receiving a latch 470. There is also a latch tab 462 coupled to bearing surface 463. Latch clasp 460 also includes tabs 466 for coupling to reset button 480 in arms 482 of reset button 480. FIG. 16B discloses a front perspective view of a latch 470 having a clasp cutout hole 474, a body section 472, and coupling tabs or latch tabs 476, for coupling to an associated lifter via a latch plate 500 (See FIG. 1B). There are also extending arms 478 forming a latch shoulder and a plunger cut out 479. FIG. 16C shows latch clasp 460 coupled to latch 470 in a manner to allow latch 470 to swing in a rotatable manner while resting in bearing surface 463. FIG. 16D shows a bottom perspective view of latch 470, coupled to latch clasp 460, with the latch clasp being coupled to reset button 480 and shows a plunger 484 having a notch section 488 forming a narrower section to receive shoulder 478 wherein the shaft of this plunger 484 in the notch section is configured to fit into the opening 479 of latch 470 so that when a plunger 484 moves axially it would control the rotational movement of latch 470. Plunger 484 has a plunger head 487 and two beveled regions 486*a* and 486*b* configured to allow latch 470 to slide into a locking region 488 bounded by these beveled regions 486*a* and 486*b* when reset button 480 is inserted into the housing. FIG. 16E is a side view of the latch 470 coupled to the reset button 480 showing the range of rotational motion via the arrow.

FIG. 17A-17G disclose a trip slider 490 which has a body section 492, a test button window 496 a latch window 498, a first ramp 491, and a second test button ramp 494. Trip slider 490 functions as both an indicator and a lock. The lock functionality of trip slider 490 is that this trip slider 490 is capable of moving from a first position to a second position, to selectively prevent the movement of test button 450 (See FIG. 15A) from a first position to a second position. Test button 450 has an associated test button spring 457 (See FIG. 15D), which biases test button 450 in the first position pressed away from trip slider 490. However, when test button 450 is pressed by a user, it moves from the first position to the second position wherein in the second position, test button 450 selectively unlatches these contacts by moving trip slider 490 to act on latch 470 to unlatch these contacts. In this case the first position of test button 450 is the position biased by spring 457, the second position of test button 450 is the position attained by test button 450 which is sufficient to cause the unlatching of the contacts.

However, the geometry and functionality of test button 450 along with the geometry and functionality of trip slider 490 allow trip slider 490 to selectively act as a lock, preventing test button 450 from reaching the second position (see the discussion below regarding FIGS. 20A-20E). For example, trip slider 490 has a second test button ramp 494 which is the test button ramp that the test button will act upon. First ramp 491 is provided for clearance and does not influence the movement of the trip slider. Alternate views of this trip slider are shown in FIGS. 17B-17G as well. Second test button ramp 494 is configured to accept complementary ramps 455*a* and 455*b* on test button 450 to cause the slider to move (when the device is reset and the test button is depressed) by pressing interface or angled surface 455*a* or 455*b* on test button 450 down on a corresponding interface or angled surface 494 on trip slider 490 to form a connection interface. With test button 450 pressing down on trip slider 490, it moves in an axial direction perpendicular to the pressed in movement of the test button for an axial to axial translation movement. With a latch 470 extending through latch window 498, the axial to axial translation movement causes a rotational movement of this latch 470 about a connection with latch clasp 460 to cause the latch to move, resulting in latch tabs 476 moving from a first position coupled to a latch plate 500 (See FIG. 18A) to a second position free from latch plate 500.

Figure 20B:
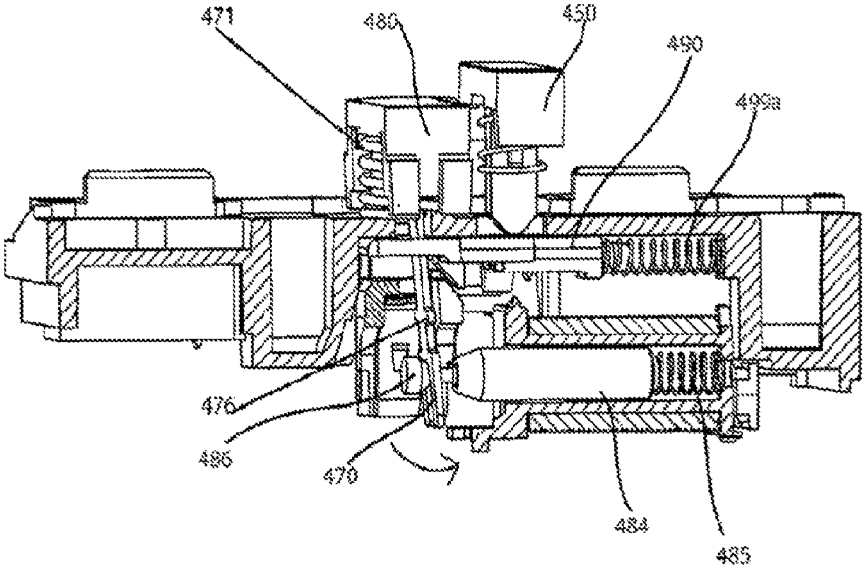

There is also a spring boss 499 coupled to the trip slider 490 to retain a trip slider spring (See FIG. 20B). Thus, when trip slider 490 is moved via the test button, spring 499*a* biases the trip slider 490 back to its original position when the test button is released. Ramps 455*a* and 455*b* are complementary so that with this design, test button 450 can be orientated in any one of two different directions.

Trip slider 490 can also function as an indicator, wherein an indication surface 492*a* of body 492 comprises an indicator which can be seen by a user outside of the housing. In at least one embodiment the indicator comprises the body surface of trip slider 490. In another embodiment, the indicator comprises a particular coloring indication of body surface 492. In another embodiment, indicator 492*a* comprises a reflective coating or surface. In another embodiment, the indicator comprises indicia. In each case, indicator 492*a* is useful in indicating to a user the position of the trip slider thereby indicating to the user whether the device is in a reset position or in a tripped position.

Figure 13E:
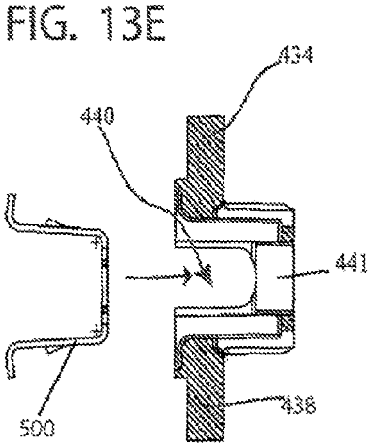
FIG. 13E is a side cross-sectional view of the lifter taken along the line A-A.
Figure 13F:
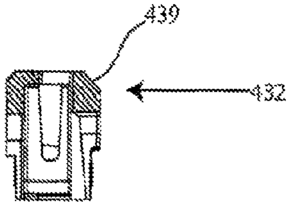
FIG. 13F is a side cross-sectional view of the lifter taken along the line B-B.

FIG. 18A shows the coupling reset button 480 to latch 470 wherein latch 470 is positioned adjacent to latch plate 500. Latch arms 476 are positioned adjacent to a back edge 505 (FIG. 18B) in a cut out region 503 of latch plate 500. Latch plate 500 includes a body section having this cut-out region 503, wherein this body section has arms or tabs 507 which are used to catch corresponding tabs 476 to cause reset button 480 which is coupled to compression spring 471 (See FIG. 16E) to pull latch plate 500 closer to trip slider 490 thereby pulling on lifter 430 which causes a lifting of contact arms. Latch plate 500 includes tabs 502 and arms 506 whereby this latch plate 500 is used to couple to the inside of a lifter as shown in FIG. 13E.

FIGS. 19A and 19B show the interaction between test button 450 and trip slider 490. FIG. 19A shows trip slider 490 in a non-reset position whereby a surface on body 492 of trip slider 490 blocks a movement of test button 450 thereby preventing the testing of the device when it is not reset. FIG. 19B shows the positioning of trip slider 490 whereby the test button can move into the test button hole 496 of slider 490, to allow for a testing of the device. Due to the configuration and or geometry of the slider 490 and the test button, this device prevents the testing of the device when it is not in a position to first be reset.

During reset, reset button 480 is pushed down, wherein the bottom surface of latch tab 476 then pushes down on the latch plate tabs 507 which in turn pushes the lifter 430 and corresponding arms 434 and 438 down against arm 401 by pressing down on wings 412 and 414. This pressing down motion causes the device to run through a test procedure, which if successful, causes the plunger to be pulled back into solenoid 341. However, if the test results are unsuccessful, then the device remains in lockout mode. This causes the plunger which has a notched section coupled to plunger cut out 479 causing latch 470 to move in a rotational manner, away from the back edge 505 (See FIG. 18B) and then the latch tabs 476 will move underneath catches or tabs 507 so that the top surface of latch tabs 476 become coupled with the latch plate causing reset button 480 having a spring to lift, or move lifter 430 to close the circuit.

As lifter 430 moves to close the circuit, angled face 439 on bobbin side 432 acts against ramp 497 on trip slider 490 so that it moves the trip slider 490 from the position shown in FIG. 19A to the position shown in FIG. 19B. In this case, it is the movement of the lifter 430 that moves the trip slider 490 into a position so that the trip slider window 496 can be engaged by the test button 450.

FIGS. 20A-20E show the progression of the mechanism of operation. This progression shows the operation of a circuit interrupting mechanism formed by at least one of a test button 450, actuator or solenoid 341, fault circuit 340, SCR 150 (See FIG. IE), latch 470, latch plate 500, lifter 430, and interrupting contacts such as contacts 343 or contact assemblies 600, 700 and contacts 721, and 722 and trip slider 490. This progression also shows the operation of a reset mechanism comprising at least one of a reset button 480, a reset spring 471, latch 470, latch plate 500, and lifter 430. Because the reset mechanism incorporating a reset lockout feature cannot be reset without first passing a test cycle, the reset mechanism can also include fault circuit 340, actuator 341, and SCR 150.

For example, in this progression, there is shown in FIG. 20A, when the device is tripped i.e. no electrical power to the load, the tabs 476 of latch 470 are positioned substantially between surface 501 (See FIG. 18B) on latch plate 500 and trip slider 490. Plunger 484 is under the influence of plunger spring 485 within solenoid 341 and holds latch 470 against back edge 505 of latch plate 500 (See FIG. 18B). Latch plate 500 has tabs 507 so that in this position these tabs 507 block latch tabs 476 from moving below surface 501, because tabs

507 contact tabs 476, blocking latch 470's movement below surface 501. In this position, trip slider 490 is positioned in a locking position to provide a locking feature. This locking feature is present when the contacts are in an unlatched or tripped state. Trip slider 490 is configured to move between at least three positions. The first position is the position of the trip slider biased by trip slider spring 499*a* when the contacts are in an unlatched state (See FIGS. 19A, and 20A). The second position, is the position of the trip slider 490 which is biased by the spring, and not biased by the test button when the contacts are in a latched state (See FIG. 20D). The third position is the position of the trip slider when the trip slider is acted on by test button 450 to cause the unlatching of the contacts as shown in FIG. 20E.

FIG. 20B shows that when a user presses down on reset button 480, reset spring 471 becomes compressed. As reset button 480 reaches the end of its travel range, bottom surface of tabs 476 press on top surface 501 of latch plate 500 pressing latch plate 500 and lifter 430 down (See also FIG. 18B). In this position, lifter arms 434 and 438 (See FIG. 13D) press against test contact arms 401, in particular the extrusions 416 and 418 (See FIG. 11), so that wings 412 and 414 are pushed onto contacts 402 and 403 (See FIG. 10A) on a circuit board 26 to cause a test cycle. In this case, a test cycle can be any known test cycle but in this embodiment is a ground fault test cycle caused by a current imbalance. With the completion of a successful test cycle, solenoid 341 energizes which moves plunger 484 toward the center of the solenoid's magnetic field which is a center point taken along the length of the windings. The movement of plunger 484 pushes against plunger spring 485 and pulls latch 470, causing it to rotate, to allow the latch tabs 476 to move away from tabs 507 allowing these tabs to pass underneath the latch tabs 507 of latch plate 500 due to the downward pressure of the reset button 480.

Figure 20C:
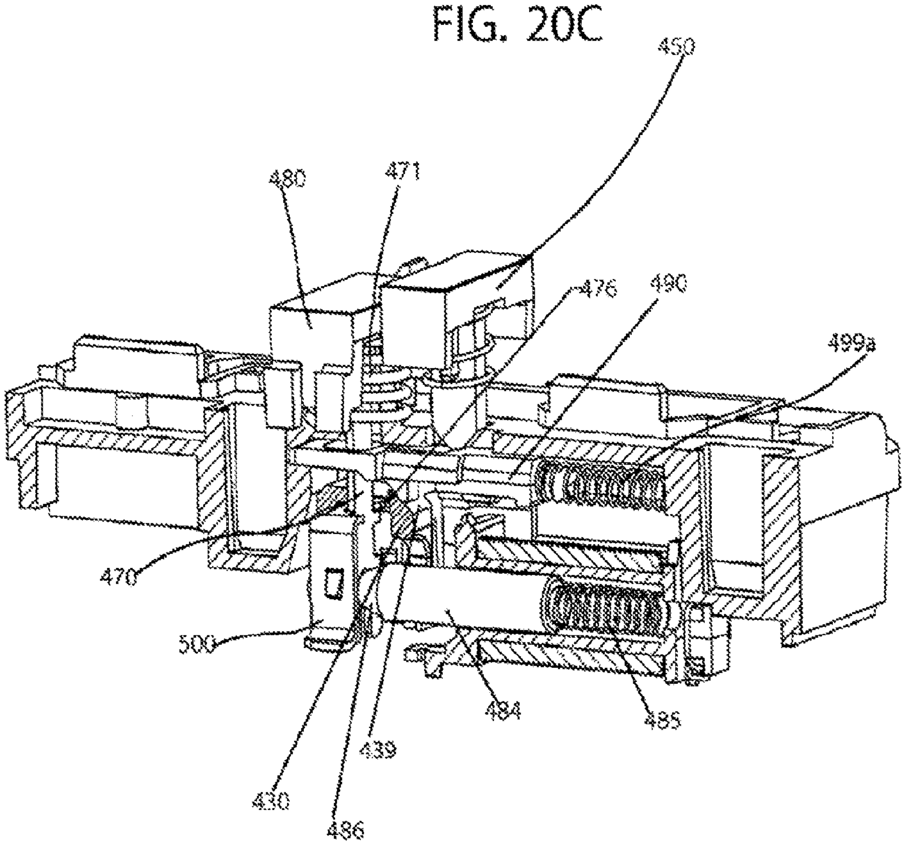

After this progression shown in FIG. 20C, as shown in FIG. 20C, plunger 484 is influenced by spring 485 in solenoid 341 and forces latch 470 to rotate and push latch 470 against the back edge 505 FIG. 18B of latch plate 500. This arrangement traps latch 470 underneath latch plate 500 by forcing latch tabs 476 between latch plate 500, in particular latch tabs 507 and the back of the housing. The user then releases the reset button assembly, and the force stored in the reset button assembly including that of reset spring 471 causes lifter 430 to move with reset button 480. As lifter 430 rises, or in this case, moves towards the front face of the housing, the angled face 439 (See FIG. 13F) of lifter 430 pushes against ramp 497 of trip slider 490, (See FIG. 17F) forcing trip slider 490 to compress trip slider spring 499*a*. The repositioning of trip slider 490 allows trip slider window 496 to line up with the test button 450 particularly with arm 454 of the test button 450. The interface between ramps 439 and 497 creates an axial to axial translation causing movement of the slider 490 to be transverse to a movement of lifter 430.

Figure 20D:
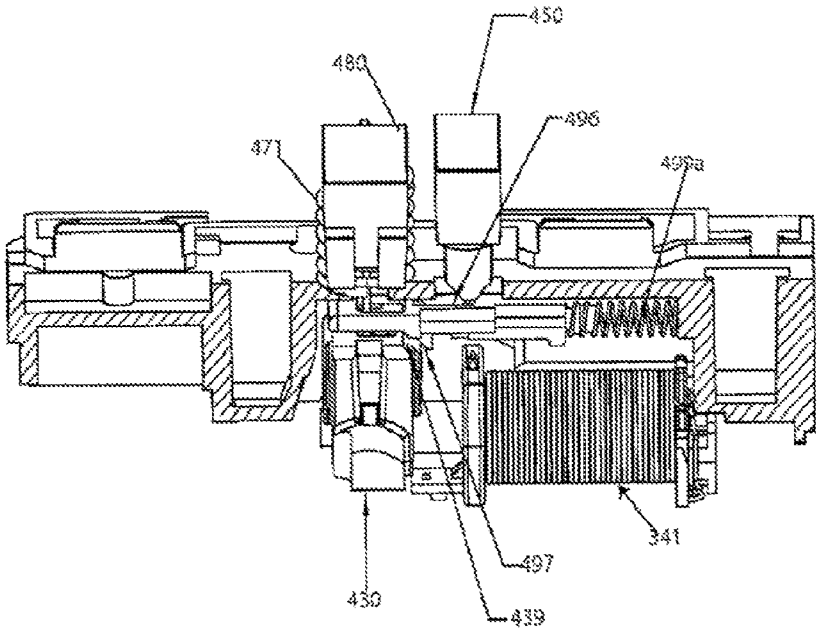
Figure 20E:
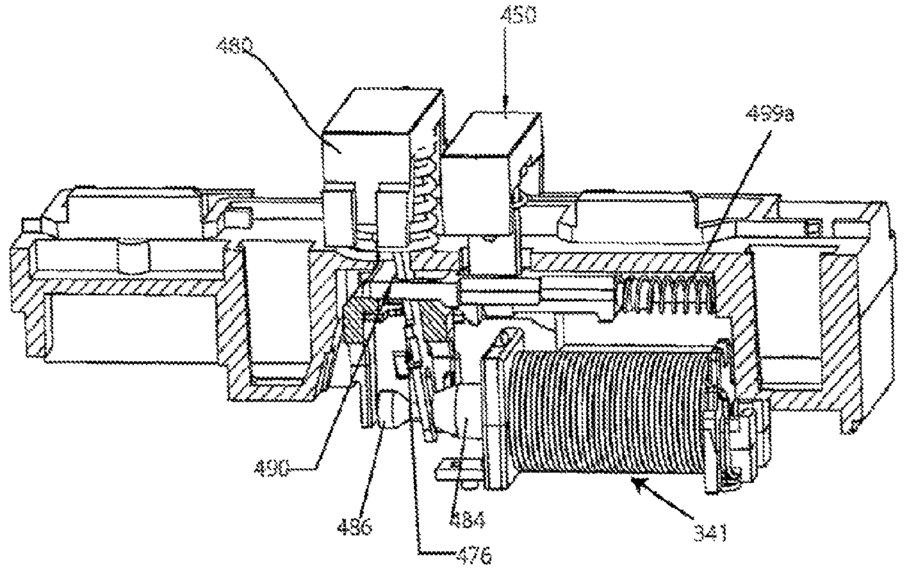

FIG. 20D shows the device in a reset position. In addition, in this position, trip slider window 496 is positioned adjacent to test button 450, thereby allowing test button 450 including any one of ramps 455*a* or 455*b* (depending on orientation) to act on trip slider 490, in particular, trip slider ramp 494. Trip slider spring 499*a* remains at least partially compressed by front edge or angled face 439 of lifter 430 pressing against ramp 497.

As shown in FIG. 20E, when the test button 450 is depressed, it can insert into trip slider window 496 to act against ramp 494 to cause trip slider 490 to move. As test button 450 is depressed, it forces trip slider 490 to compress trip slider spring 499*a*. Eventually, trip slider 490 moves a sufficient amount so that it acts against latch 470. Trip slider 490 forces latch 470 to rotate and disengage tabs 476 on latch 470 from the underside of latch plate 500 particularly tabs 507, thereby releasing latch 470 from latch plate 500 allowing lifter 430 to move away from the back face, thereby mechanically tripping the mechanism. Upon release of the test button 450, the trip slider 490 and test button 450 move back into position shown in FIG. 20A, which is an unlatched position allowing for future resetting of the device.

Figure 21A:
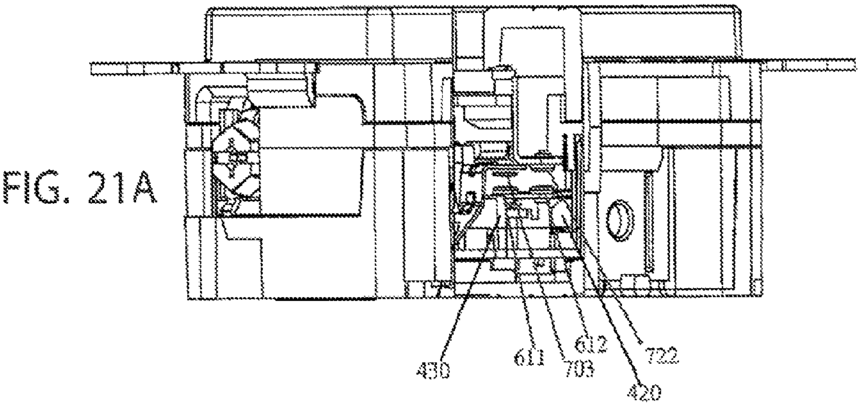
FIG. 21A is a side view of one embodiment of the device with the contacts in an un latched position.
Figure 21B:
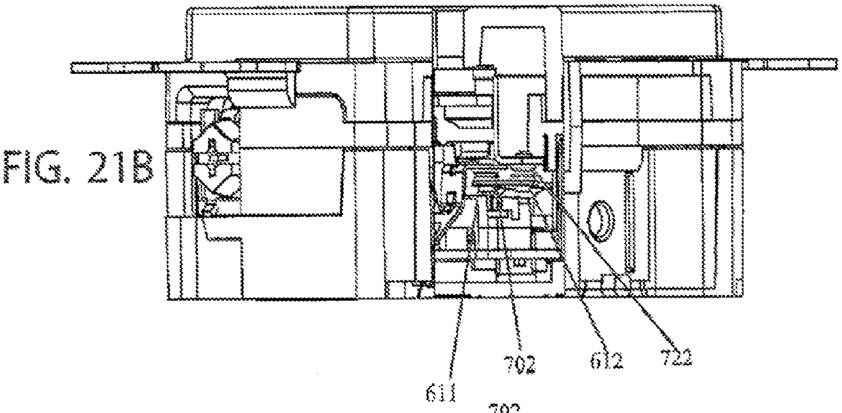
FIG. 21B is a side view of the device shown in FIG. 21A with the contacts in an intermediate position.
Figure 21C:
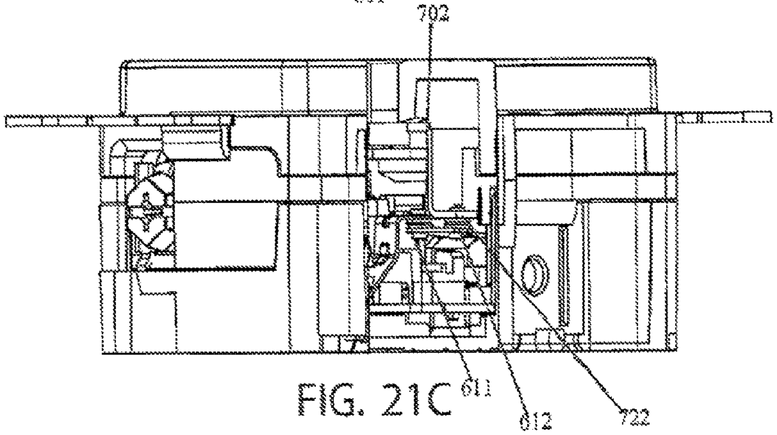
FIG. 21C is a side view of the device shown in FIG. 21A with the contacts in a latched position.
Figure 22A:
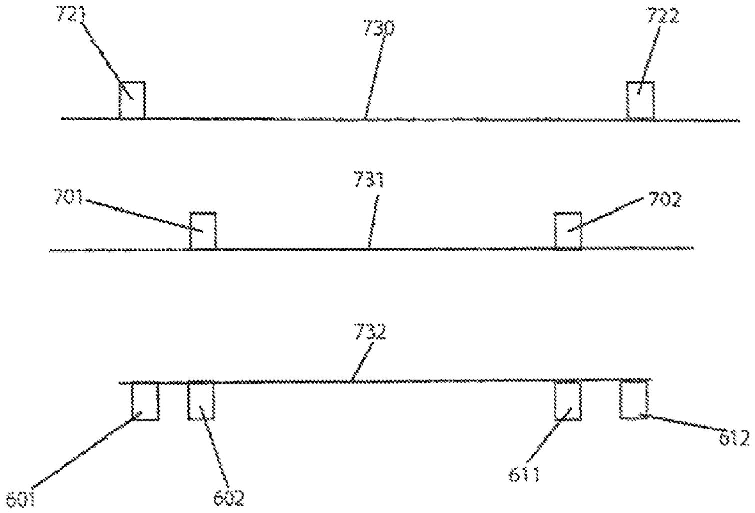
FIG. 22A is a graphical representation of the contacts in an unlatched position.
Figure 22B:
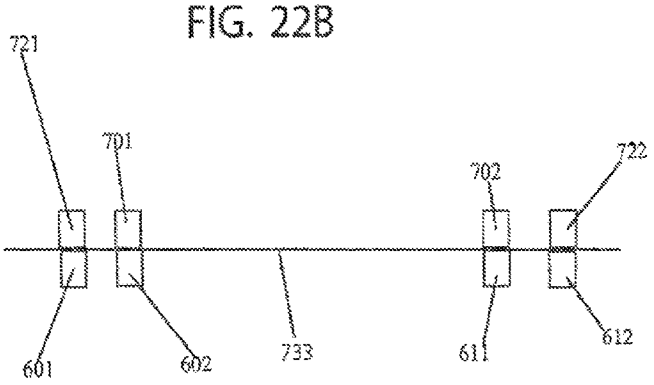
FIG. 22B is a graphical representation of the contacts in a latched position.

FIG. 21A-21C show the different settings for the contacts which is also shown in FIGS. 22A and 22B. FIGS. 21A-21C show one half of the view of these contacts, with this configuration being the same for the opposite side. These contacts are associated with three different sets of conductors, a line side conductor, a load side conductor and a face conductor. Contacts 601, 602 and 611, and 612 are coupled to the first or line side conductors 600 and 610 respectively. Contacts 701, and 702 are coupled to second or load side conductors 703 and 704 respectively. Contacts 721 and 722 are coupled to third or load face side conductors 521 and 523 (See FIG. 23D). In this case, contact 601 is a line side movable arm face neutral contact, contact 602 is a line side movable arm load neutral contact, contact 611 is a line side movable arm face phase contact, contact 612 is a line side movable arm load phase contact, contact 701 is a load neutral arm contact, contact 702 is a load phase arm contact, contact 721 is a face neutral terminal contact, while contact 722 is a face phase terminal contact.

For example, FIG. 22A shows one side of the unlatched position or first spatial arrangement of contacts 601, 602, 701, and 721, wherein contacts 611 and 612 connected to conductor 610 are shown positioned resting on load movable arm support 420, particularly on support 425. In this case, conductor 704 which is coupled to contact 702 is in an unmoved, and unlatched state, while contact 722 is positioned in a stationary position inside of intermediate or middle housing 35, or 437. In this unlatched state, the contacts and thereby their associated conductors are positioned on three different planes 730, 731, and 732 as shown in FIG. 22A. In this case, the first plane 732 is the position of the line side contacts. The second plane 731 is the position of the load slide contacts, while the third plane 730 is the position of the face side contacts.

In FIG. 22B, lifter 430 is moved into a second intermediate position, thereby moving conductor 610 into a second position so that contact 612 contacts contact 722. In this intermediate state, power is provided from the line side to the load side but it is not provided to the face terminals because contact 602 is not in contact with contact 701. This position forms the second spatial arrangement of these contacts. Next, in FIG. 21C, lifter 430 is moved into the third position, wherein all of the contacts are latched together such that there is a single plane of contact 733 between line side contacts 601, 602, 611 and 612, load side contacts 701, and 702, and face side contacts 721, and 722 as shown in FIG. 22B. Thus, the first conductor forming the line side conductor, the second conductor forming the load side conductor, and the third conductor comprising the load side face conductor are all on the same plane in this position. This closed or latched position forms the third spatial arrangement for these contacts. In this case, each conductor which has associated set of contacts each has a phase side contact or set of contacts and a neutral side contact or set of contacts. Thus, contacts 601, 602 can be neutral side contacts, while contacts 611 and 612 can be phase side contacts or vice versa if connected differently. Thus if contacts 601, and 602 are neutral side contacts, then contacts 701, and 721 are neutral side contacts as well, while contacts 702 and 722 are phase side contacts which are configured to be in contact with phase side contacts 611 and 612. In this case as shown in FIGS. 22A and 22B, the contacts from the first conductor including contacts 601, and 602, are capable of contacting the contacts 721, and 701 of the second conductor, while contacts 611 and 612 are capable of contacting the contacts 702, and 722 of the third conductor. However, in the unlatched condition, the contacts 701, and 702 of the second conductor, and the contacts 721, and 722 of the third conductor are positioned offset from each other.

Figure 23F:
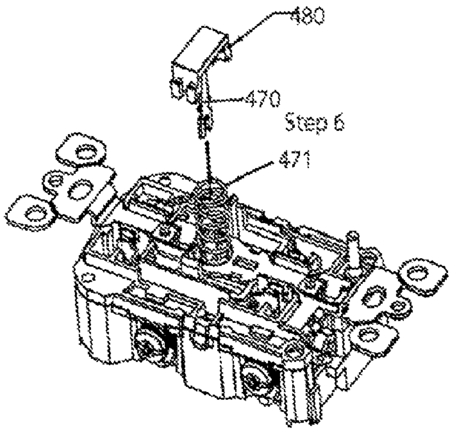
FIG. 23F is a perspective view of the reset button assembly being inserted into the reset spring.

FIGS. 23A-23I show an example of the steps for the progression of assembly of the device shown in FIGS. 1-20E. For example, as shown in FIG. 23A in step 1, the assembly 400 shown in FIG. 10B is inserted into a back housing such as housing 33. Next, as shown in FIG. 23B, trip slider spring 499*a* is coupled to trip slider 490. Next, trip slider 490 is coupled to middle housing 437, in particular, snapped into snap 448 which allows trip slider 490 to move in a channel in middle housing 437.

Figure 23G:
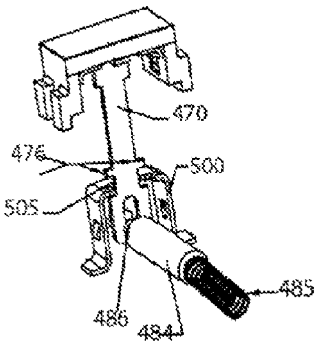
FIG. 23G is a perspective view of the reset button being coupled to the plunger.
Figure 23H:
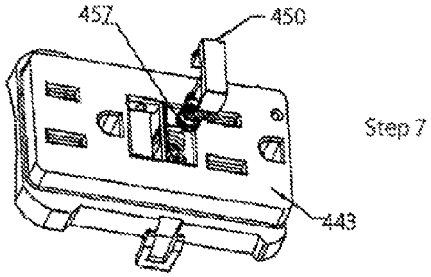
FIG. 23H is a perspective view of the test button being inserted into the front cover.

Next, as shown in FIG. 23C, and in step 3, this middle housing assembly comprising middle housing 437, trip slider 490 and trip slider spring 499*a* is placed onto back housing 33, and adjacent to the assembly 400. Next, in step 4 and as shown in FIG. 23D, strap 520 including face phase conductor 521, and face neutral conductor 523 are coupled to middle housing 437. Next, in step 5 and as shown in FIG. 23E, reset spring 471 is coupled to this assembly, particularly to spring holder 437*a* in middle housing 437. Next, in step 6, the reset button assembly including reset button 480, latch clasp 460 and latch 470 are placed through the center of reset spring 471. This reset button assembly must be placed such that latch 470 engages plunger 484 and latchplate 500 as shown in FIG. 23G. Next, in step 7, and as shown in FIG. 23H, test button 450 including test button spring 457 is placed into the face cover. The test button is then inserted into the test button opening 444 in front face cover 37 or 443.

Figure 23I:
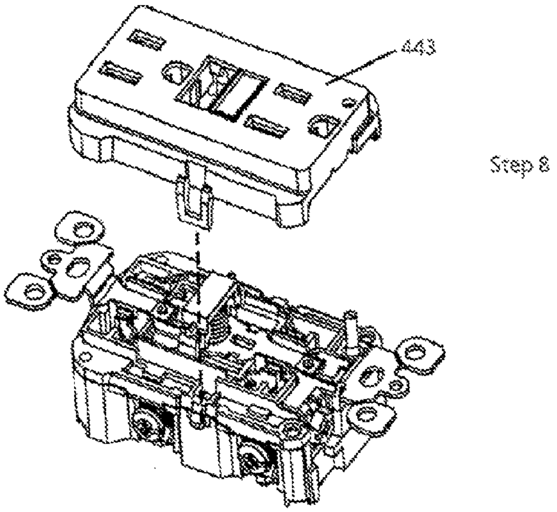
FIG. 23I is a perspective view of the front cover being coupled to the remaining assembly.

Finally, in step 8 and as shown in FIG. 23I front cover 37 or 443 is then placed onto the assembly and then secured to this assembly.

As stated above, any one of the embodiments shown in FIGS. 1-9 may be used in combination with any one of the embodiments shown in FIGS. 10A-23I. Alternatively, the embodiments shown in FIGS. 1-9 may be used separate from the embodiments shown in FIGS. 10A-23I. Furthermore, the embodiments shown in FIGS. 10A-23I may be used separate from the embodiments shown in FIGS. 1-9 as well.

Some of the benefits of the above embodiments are that because there are nested transformers such as shown in the embodiments of FIGS. 1-9, the depth of the housing can be reduced thereby allowing for greater room in a wallbox to wire or connect wires to the device.

In addition, with the embodiments shown in FIGS. 10A-23I, one benefit is that because the latch has a momentum force which is placed on a latch such as latch 470 opposite its axis of rotation, this increases the mechanical advantage a device would have in rotating latch 470 against frictional forces. In addition, with this design, because of a rotating latch, rather than a translating latch plate, this reduces the amount of frictional surface which would be formed when moving the latch, to either open or latch the contacts. An additional benefit is that because there is a mechanical advantage in actuating or rotating latch 470 at an end opposite its axis of rotation, this results in an easier latching and unlatching of this latch. Therefore, due to the increased ease of motion, a smaller solenoid can be used to selectively latch and unlatch latch 470 from latch plate 500. Therefore, because a smaller solenoid can be used, the depth of the device can be further reduced.

Furthermore, the addition of a trip slider such as trip slider 490 creates a device which can provide indication status for the state of the device as well. For example, trip slider 490 can include an indicator such as a colored surface which when used in conjunction with a translucent section or cut out 443*a* on the front cover or in conjunction with a translucent test button, this colored surface allows a user to track the position of the trip slider from a latched position to an unlatched position. In addition, because of the incorporation of this trip slider 490, this disables the function of test button 450 thereby presenting a mechanical means for preventing the testing and resetting the device.

Accordingly, while only a few embodiments of the present invention have been shown and described, it is obvious that many changes and modifications may be made thereunto without departing from the spirit and scope of the invention.

What is claimed is:

1. A circuit interrupting device comprising:

a) a housing having front face;

b) a first electrical conductor at least partially disposed within the housing;

c) a second electrical conductor at least partially disposed within the housing;

d) a third electrical conductor at least partially disposed within the housing;

e) fault detection circuit;

f) a reset button at least partially disposed in said housing;

g) a latch rotatable between a reset position; and a trip position; and h) a circuit interrupter configured to be energized upon the occurrence of a fault to engage said latch and cause the latch to rotate from the reset position to the trip position;

wherein at least one of said first, second, and third electrical conductors is movable between a first position wherein said conductors are electrically isolated from each other, and said first, second, and third conductors are positioned at different distances with respect to the front face; and a second position wherein said conductors are electrically connected to each other and at least two of the first, second, and third electrical conductors are positioned at a substantially same distance with respect to the front face.

2. The circuit interrupting device as in claim I. wherein said first electrical conductor is a line conductor, said second electrical conductor is a load conductor, and said third electrical conductor is a face conductor.

3. The device as in claim 1, further comprising a trip slider having a non-electrical trip indicator disposed in said housing.

4. The de of claim 3, wherein said housing further comprises a window configured to allow a user to visually identify said trip indicator inside of said housing.

5. The device as in claim 3, further comprising a test button, wherein said trip slider is configured to be movable to a trip position from a reset position upon actuation by said test button.

6. The device as in claim 5, further comprising a slider spring coupled to said trip slider, said slider spring biasing said trip slider towards said trip position.

7. The device as in claim 5, wherein said trip slider comprises at leas amp surface, said trip slider positioned relative to said test button when in the reset position such that said test button interfaces with said ramp surface upon actuation of said test button causing said trip slider to move to said trip position.

8. The device as in claim 5, therein said trip slider in said trip position inhibits actuation of said test button.

9. A circuit interrupting device comprising:

a) a housing having a front face;

b) a first electrical conductor at least partially disposed within the housing:

c) a second electrical conductor at least partially disposed within the housing;

d) a third electrical conductor at least partially disposed within the housing; and e) a fault detection circuit including a first transformer and a second transformer, each of the first and second transformers having a top surface and a bottom surface, the first transformer having at least one outer region forming an outer periphery and at least one inner hollow region, and the second transformer disposed at least partially in said at least one inner hollow region of said first transformer, wherein magnetic shielding is absent from at least one of the top or bottom surfaces of each of the first and second transformers, wherein at least one of the first transformer and said second transformer are configured to detect at least one fault; and wherein at least one of said first, second, and third electrical conductors is movable between a first position wherein said conductors are electrically isolated from each other, and said first, second, and. third conductors are positioned at different distances with respect to the front the and a second position wherein said conductors are electrically connected to each other and at least two of the first, second, and third electrical conductors are positioned at a substantially same distance with respect to the front face.

10. The device as in claim 9, further comprising a circuit interrupter and a trip slider, the trip slider comprising a non-electrical trip indicator disposed in said housing.

11. The device of claim 10, wherein said housing further comprises a window configured to allow a user to visually identify said trip indicator inside of said housing.

12. The device as in claim 10, further comprising a test button, wherein said trip slider is configured to be movable to a trip position from a reset position upon actuation by said test button.

13. The device as in claim 12, further comprising a slider spring coupled to said trip slider, said slider spring biasing said trip slider towards said trip position.

14. The device as in claim 12, wherein said trip slider in said trip position inhibits actuation of said test button.

15. The device as in claim 9, wherein at least one of said first transformer and said second transformer comprises a differential transformer and wherein another of said first transformer and said second transformer comprises a grounded neutral transformer.

16. A circuit interrupting device comprising:

a) a housing;

b) a fault detection circuit disposed in said housing, the fault detection circuit including a first sensor and a second sensor, the first sensor having at least one outer region forming an outer periphery and at least one inner hollow region, and the second sensor disposed at least partially in said at least one inner hollow region of said first sensor, wherein at least one of the first sensor and said second sensor are configured to detect at least one fault;

c) a reset button at least partially disposed in said housing;

d) a latch disposed in said housing and configured to he rotatable between a reset position and a tip position; and e) a circuit interrupter configured to be energized upon the occurrence of a fault to engage said latch and cause the latch to rotate from the reset position to the trip position.

17. The device as in claim 16, further comprising:

a) a first electrical conductor a least partially disposed within the housing;

b) a second electrical conductor at least partially disposed within the housing; and c) a third electrical conductor at least partially disposed within the housing, wherein the housing includes a front face, and wherein at least one of the first, second, and third electrical conductors is movable between a first position wherein the conductors are electrically isolated from each other, and the first, second, and third conductors are positioned at different distances with respect to the front face; and a second position wherein the conductors are electrically connected to each other and at least two of the first, second, and third electrical conductors are positioned at a substantially same distance with respect to the front face.

18. The device as in claim 17, further comprising a trip slider comprising a non-electrical trip indicator disposed in the housing.

* * * * *

UNITED STATES PATENT AND TRADEMARK OFFICE

CERTIFICATE OF CORRECTION

PATENT NO. : 9,053,886 B2
APPLICATION NO. : 14/031756
DATED : June 9, 2015
INVENTOR(S) : Michael Kamor, James Porter and Kurt Dykema It is certified that error appears in the above-identified patent and that said Letters Patent is hereby corrected as shown below:

Claims

Claim 1, Column 20, Line 26, “fault detection circuit;” should read “a fault detection circuit;”

Claim 1, Column 20, Line 28, “position;” should read “position”

Claim 2, Column 20, Line 43, “I.” should read “1,”

Claim 4, Column 20, Line 50, “de” should read “device”

Claim 7, Column 20, Line 61, “leas amp” should read “least one ramp”

Claim 7, Column 20, Line 64, “button” should read “button,”

Claim 8, Column 20, Line 66, “therein” should read “wherein”

Claim 9, Column 21, Line 4, “housing:” should read “housing;”

Claim 9, Column 21, Line 25, “front the” should read “front face;”

Claim 16, Column 22, Line 18, “he” should read “be”

Claim 16, Column 22, Line 19, “tip” should read “trip”

Claim 17, Column 22, Line 24, “a least” should read “at least”

Signed and Sealed this
Fifth Day of January, 2016

Michelle K. Lee

Michelle K. Lee
*Director of the United States Patent and Trademark Office*